(12) United States Patent
Karyodisa et al.

(10) Patent No.: US 10,699,126 B2
(45) Date of Patent: Jun. 30, 2020

(54) ADAPTIVE OBJECT DETECTION AND RECOGNITION

(71) Applicant: QUALCOMM Incorporated, San Diego, CA (US)

(72) Inventors: Ronald Karyodisa, San Diego, CA (US); Pengjun Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 15/965,665

(22) Filed: Apr. 27, 2018

(65) Prior Publication Data

US 2019/0213420 A1 Jul. 11, 2019

Related U.S. Application Data

(60) Provisional application No. 62/615,228, filed on Jan. 9, 2018.

(51) Int. Cl.
*G06K 9/00* (2006.01)
*G06T 3/40* (2006.01)

(52) U.S. Cl.
CPC ..... *G06K 9/00718* (2013.01); *G06K 9/00228* (2013.01); *G06K 9/00288* (2013.01); *G06T 3/40* (2013.01)

(58) Field of Classification Search
CPC ............. G06K 9/00255; G06K 9/3241; G06K 9/00771; G06K 9/00; G06K 9/00281; G06K 9/00671; G06K 9/00127; G06K 9/00201; G06K 9/00228; G06K 9/00362; G06K 9/00624; G06K 9/00677; G06K 9/00751; G06K 9/00288; G06K 9/00221;
(Continued)

(56) References Cited

U.S. PATENT DOCUMENTS 5,689,442 A * 11/1997 Swanson .......... G08B 13/19647
340/500
7,876,978 B2 1/2011 Berger et al.
(Continued)

FOREIGN PATENT DOCUMENTS

WO 2017143407 A1 8/2017

*Primary Examiner* — Aklilu K Woldemariam
(74) *Attorney, Agent, or Firm* — Qualcomm Incorporated

(57) ABSTRACT

Techniques and systems are provided for performing object recognition for video frames. For example, one or more video frames of a first video are obtained. The one or more video frames have a first resolution and include one or more objects. The one or more objects are detected in the one or more video frames of the first video based on object detection being performed on the one or more video frames. One or more video frames of a second video are also obtained. The one or more video frames of the second video also include the one or more objects and have a second resolution that is greater than the first resolution. An object recognition process is performed on the one or more video frames of the second video to recognize or identify the one or more objects detected in the one or more video frames of the first video. In some cases, feedback associated with the object detection and/or the object recognition process can be obtained, and a resolution of the first video and/or a resolution of the second video can be adjusted based on the feedback.

30 Claims, 11 Drawing Sheets

(58) Field of Classification Search
CPC ........ G06K 9/00234; G06K 9/52; G06T 7/20; G06T 2207/10016; G06T 7/246; G06T 7/74; G06T 17/05; G06T 3/0012; G06T 3/60; H04N 5/2256; H04N 5/2259; H04N 5/23219; H04N 5/247; H04N 5/33; H04N 1/2112; H04N 2101/00; H04N 7/183; H04N 5/217; H04N 7/181; H04N 21/23439; H04N 21/44008; H04N 21/4402; H04N 21/45455; H04N 21/4223; G02B 2027/014; G08B 13/19641; G08B 13/19647; G08B 13/19613; H04H 60/48; H04H 60/59; G06F 16/7837; G06F 16/784
USPC .......... 348/25, 143, 159; 382/103, 104, 195, 382/199, 298
See application file for complete search history.

(56) References Cited

U.S. PATENT DOCUMENTS

| | | | |
|---|---|---|---|
| 8,947,522 B1 * | 2/2015 | Hickman | H04N 7/18 348/114 |
| 9,686,338 B1 | 6/2017 | Farrell et al. | |
| 9,996,638 B1 * | 6/2018 | Holz | G06F 3/017 |
| 10,264,211 B2 * | 4/2019 | Leech | H04N 19/115 |
| 2005/0123201 A1 * | 6/2005 | Nakashima | G06K 9/3241 382/195 |
| 2008/0166016 A1 * | 7/2008 | Sibiryakov | G06K 9/6203 382/103 |
| 2009/0219391 A1 * | 9/2009 | McLeish | G06T 7/277 348/143 |
| 2010/0002074 A1 * | 1/2010 | Niem | G06T 3/0012 348/43 |
| 2011/0063446 A1 * | 3/2011 | McMordie | G06K 9/209 348/159 |
| 2011/0116682 A1 * | 5/2011 | Wang | G06T 7/44 382/103 |
| 2011/0128150 A1 | 6/2011 | Kanga et al. | |
| 2011/0129121 A1 * | 6/2011 | Corcoran | G06K 9/6257 382/103 |
| 2013/0126703 A1 * | 5/2013 | Caulfield | H04N 5/30 250/206 |
| 2014/0140575 A1 * | 5/2014 | Wolf | G06K 9/00771 382/103 |
| 2015/0078723 A1 * | 3/2015 | Curcio | G11B 27/34 386/223 |
| 2015/0156522 A1 * | 6/2015 | Shaw | H04N 7/0122 348/445 |
| 2016/0217348 A1 * | 7/2016 | Cho | G06K 9/00751 |
| 2016/0275354 A1 * | 9/2016 | Andalo | H04N 19/154 |
| 2017/0339417 A1 * | 11/2017 | Puri | G06K 9/4614 |

* cited by examiner

400A

400B

900

OBTAIN ONE OR MORE VIDEO FRAMES OF A FIRST VIDEO, THE ONE OR MORE VIDEO FRAMES INCLUDING ONE OR MORE OBJECTS, WHEREIN THE ONE OR MORE VIDEO FRAMES OF THE FIRST VIDEO HAVE A FIRST RESOLUTION
902

↓

PERFORM OBJECT DETECTION TO DETECT THE ONE OR MORE OBJECTS IN THE ONE OR MORE VIDEO FRAMES OF THE FIRST VIDEO
904

↓

OBTAIN ONE OR MORE VIDEO FRAMES OF A SECOND VIDEO, THE ONE OR MORE VIDEO FRAMES INCLUDING THE ONE OR MORE OBJECTS, WHEREIN THE ONE OR MORE VIDEO FRAMES OF THE SECOND VIDEO HAVE A SECOND RESOLUTION THAT IS GREATER THAN THE FIRST RESOLUTION
906

↓

PERFORM AN OBJECT RECOGNITION PROCESS ON THE ONE OR MORE OBJECTS, THE OBJECT RECOGNITION PROCESS BEING PERFORMED ON THE ONE OR MORE VIDEO FRAMES OF THE SECOND VIDEO
908

↓

OBTAIN FEEDBACK ASSOCIATED WITH ONE OR MORE OF THE OBJECT DETECTION PERFORMED ON THE ONE OR MORE VIDEO FRAMES OF THE FIRST VIDEO OR THE OBJECT RECOGNITION PROCESS PERFORMED ON THE ONE OR MORE VIDEO FRAMES OF THE SECOND VIDEO
910

↓

ADJUST ONE OR MORE OF A RESOLUTION OF THE FIRST VIDEO OR A RESOLUTION OF THE SECOND VIDEO BASED ON THE FEEDBACK
912

FIG. 9

ADAPTIVE OBJECT DETECTION AND RECOGNITION

CROSS-REFERENCE TO RELATED APPLICATIONS

This application claims the benefit of U.S. Provisional Application No. 62/615,228, filed Jan. 9, 2018, which is hereby incorporated by reference, in its entirety and for all purposes.

FIELD

The present disclosure generally relates to object detection and recognition, and more specifically to techniques and systems for performing adaptive object detection and recognition.

BACKGROUND

Object detection can be used to locate objects in a digital image or a video frame of a video clip. Object recognition can be used to identify or verify an object from a digital image or a video frame. One example of object detection and recognition is face detection and recognition, where a face of a person is detected and recognized. For instance, the features of a face can be extracted from an image and compared with features stored in a database in an attempt to recognize the face. In some cases, the extracted features are fed to a classifier and the classifier will give the identity of the input features. Object detection and recognition are time and resource intensive processes.

BRIEF SUMMARY

In some examples, techniques and systems are described for performing adaptive object detection and recognition. For example, object detection can be performed on one or more images having a first resolution to detect one or more objects in the one or more images, while object recognition can be performed on one or more images having a second resolution to recognize the one or more objects in the one or more images having the second resolution. The first resolution is a lower resolution than the second resolution, such that the one or more images having the first resolution have a lower resolution than the one or more images having the second resolution. The one or more images of the first resolution and the one or more images of the second resolution are synchronized in time and with respect to content.

In some cases, feedback information from the object detection performed on the one or more images having the first resolution and/or object recognition on the one or more images having the second resolution can be used to adjust the resolution of the first stream for object detection, the second stream for object recognition, or both the first and second streams for object detection and object recognition.

According to at least one example, a method of performing object recognition for video frames is provided. The method includes obtaining one or more video frames of a first video. The one or more video frames include one or more objects. The one or more video frames of the first video have a first resolution. The method further includes performing object detection to detect the one or more objects in the one or more video frames of the first video. The method further includes obtaining one or more video frames of a second video. The one or more video frames of the second video include the one or more objects. The one or more video frames of the second video have a second resolution that is greater than the first resolution. The method further includes performing an object recognition process on the one or more objects. The object recognition process is performed on the one or more video frames of the second video. The method further includes obtaining feedback associated with one or more of the object detection performed on the one or more video frames of the first video or the object recognition process performed on the one or more video frames of the second video. The method further includes adjusting one or more of a resolution of the first video or a resolution of the second video based on the feedback.

In another example, an apparatus for performing object recognition for video frames is provided that includes a memory configured to store one or more video frames and a processor. The processor is configured to and can obtain one or more video frames of a first video. The one or more video frames include one or more objects. The one or more video frames of the first video have a first resolution. The processor is further configured to and can perform object detection to detect the one or more objects in the one or more video frames of the first video. The processor is further configured to and can obtain one or more video frames of a second video. The one or more video frames of the second video include the one or more objects. The one or more video frames of the second video have a second resolution that is greater than the first resolution. The processor is further configured to and can perform an object recognition process on the one or more objects. The object recognition process is performed on the one or more video frames of the second video. The processor is further configured to and can obtain feedback associated with one or more of the object detection performed on the one or more video frames of the first video or the object recognition process performed on the one or more video frames of the second video. The processor is further configured to and can adjust one or more of a resolution of the first video or a resolution of the second video based on the feedback.

In another example, a non-transitory computer-readable medium is provided that has stored thereon instructions that, when executed by one or more processors, cause the one or more processor to: obtain one or more video frames of a first video, the one or more video frames including one or more objects, wherein the one or more video frames of the first video have a first resolution; perform object detection to detect the one or more objects in the one or more video frames of the first video; obtain one or more video frames of a second video, the one or more video frames including the one or more objects, wherein the one or more video frames of the second video have a second resolution that is greater than the first resolution; perform an object recognition process on the one or more objects, the object recognition process being performed on the one or more video frames of the second video; obtain feedback associated with one or more of the object detection performed on the one or more video frames of the first video or the object recognition process performed on the one or more video frames of the second video; and adjust one or more of a resolution of the first video or a resolution of the second video based on the feedback.

In another example, an apparatus for performing object recognition for video frames is provided. The apparatus includes means for obtaining one or more video frames of a first video. The one or more video frames include one or more objects. The one or more video frames of the first video have a first resolution. The apparatus further includes means for performing object detection to detect the one or more objects in the one or more video frames of the first video. The apparatus further includes means for obtaining one or more video frames of a second video. The one or more video frames of the second video include the one or more objects. The one or more video frames of the second video have a second resolution that is greater than the first resolution. The apparatus further includes means for performing an object recognition process on the one or more objects. The object recognition process is performed on the one or more video frames of the second video. The apparatus further includes means for obtaining feedback associated with one or more of the object detection performed on the one or more video frames of the first video or the object recognition process performed on the one or more video frames of the second video. The apparatus further includes means for adjusting one or more of a resolution of the first video or a resolution of the second video based on the feedback.

In some aspects, the methods, apparatuses, and computer-readable medium described above further comprise: obtaining feedback associated with the object detection performed on the one or more video frames of the first video; adjusting the resolution of the first video based on the feedback; and detecting at least one object in a subsequent video frame of the first video after the resolution of the first video is adjusted, the at least one object being detected based on object detection being performed on the subsequent video frame having the adjusted resolution.

In some aspects, the methods, apparatuses, and computer-readable medium described above further comprise: obtaining feedback associated with the object recognition process performed on the one or more video frames of the second video; adjusting the resolution of the second video based on the feedback; and performing the object recognition process on at least one object in a subsequent video frame of the second video after the resolution of the second video is adjusted, the object recognition process being performed on the subsequent video frame having the adjusted resolution.

In some aspects, the methods, apparatuses, and computer-readable medium described above further comprise: adjusting the resolution of the first video to a first adjusted resolution based on the feedback; adjusting the resolution of the second video to a second adjusted resolution based on the feedback; detecting at least one object in a subsequent video frame of the first video after the resolution of the first video is adjusted, the at least one object being detected based on object detection being performed on the subsequent video frame having the first adjusted resolution; and performing the object recognition process on the at least one object detected in the subsequent video frame of the first video, the object recognition process being performed on a subsequent video frame of the second video after the resolution of the second video is adjusted, the subsequent video frame of the second video having the second adjusted resolution.

In some aspects, the feedback is based on one or more of a latency of the object detection, a quality of results from the object detection performed on one or more objects in the one or more video frames of the first video, a latency of the object recognition process, or a quality of results from the object recognition process performed on one or more objects in the one or more video frames of the second video, or any combination thereof.

In some implementations, adjusting one or more of the resolution of the first video or the resolution of the second video based on the feedback includes: determining, based on the feedback, that a latency of the object detection performed on the one or more video frames of the first video is greater than a latency threshold; and reducing a resolution of at least one video frame of the first video based on the latency of the object detection being greater than the latency threshold.

In some implementations, adjusting one or more of the resolution of the first video or the resolution of the second video based on the feedback includes: determining, based on the feedback, that a confidence score generated for the one or more objects by the object recognition process is less than a quality threshold; and increasing a resolution of at least one video frame of the second video based on the confidence score being less than the quality threshold.

In some aspects, the methods, apparatuses, and computer-readable medium described above further comprise: determining object information associated with the one or more detected objects based on the object detection performed on the one or more video frames of the first video; modifying the object information from the first resolution to the second resolution; and performing the object recognition process on the one or more video frames of the second video using the modified object information.

In some aspects, modifying the object information from the first resolution to the second resolution includes upscaling the object information from the first resolution to the second resolution. In some examples, object information associated with a detected object includes information defining a bounding region generated for the detected object. In some aspects, modifying the object information from the first resolution to the second resolution includes upscaling the bounding region from a first size to a second size. In such aspects, the second size is based on a ratio between the first resolution and the second resolution.

In some aspects, performing the object recognition process on the one or more video frames of the second video using the modified object information includes performing the object recognition process on a region of the one or more video frames of the second video corresponding to the upscaled bounding region.

In some aspects, object information associated with a detected object includes information defining one or more landmarks on the detected object. In some cases, modifying the object information from the first resolution to the second resolution includes changing a location of a landmark from a first location to a second location. In such cases, the second location is based on a ratio between the first resolution and the second resolution.

In some examples, the first video and the second video are time synchronized. In some aspects, the first video and the second video are obtained from two different video streams. In some cases, the first video is a downscaled version of the second video. In one illustrative example, the first video is obtained by downscaling the second video from the second resolution to the first resolution.

In some aspects, the one or more objects include one or more faces, and the object recognition includes face recognition.

In some aspects, the apparatus includes a camera for capturing the video frames. In some aspects, the apparatus comprises a mobile device with a camera for capturing the video frames. In some aspects, the apparatus includes a display for displaying the video frames.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 9 is a flowchart illustrating an example of a process of performing object recognition for video frames, in accordance with some embodiments.

DETAILED DESCRIPTION

Figure 1:
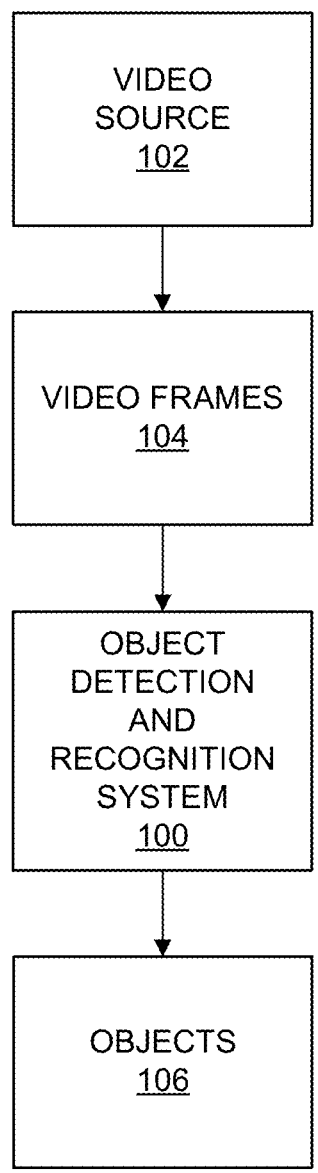
FIG. 1 is a block diagram illustrating an example of system for detecting and recognizing objects in one or more video frames, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As described in more detail herein, techniques and systems are described for performing adaptive object detection and recognition. A first stream of one or more images can be used for object detection, and a second stream of one or more images can be used for object recognition. The first steam of one or more images has a lower resolution than the second stream of one or more images. The first stream and the second stream can be synchronized in time and in content, such that the corresponding images of the two streams are captured at the same time and from a same perspective and/or come from the same source such as a camera sensor, thus capturing the same objects in a scene at the same time instances. For instance, a first image of the first stream has the same content as a first image of the second stream (captured at the same time and from a same perspective, thus capturing the same objects in a scene at the same time), except that the first image of the first stream has a lower resolution than the first image of the second stream. Using the first stream, object detection can be performed to detect one or more objects in the one or more images of the first stream. The object detection results (e.g., bounding box and object information for each object) can then be provided for use by an object recognition process. For example, using the object detection results, object recognition can be performed on one or more images of the second stream to recognize the one or more objects in the one or more images of the second stream. In some examples, feedback information from object detection and/or object recognition can be used to adjust the resolution of the first stream for object detection, the second stream for object recognition, or both the first and second streams for object detection and object recognition. Details of an example object detection and recognition system are described below with respect to FIG. 1 and FIG. 2.

The techniques and systems described herein can be used in any suitable device for any suitable application. For example, the object detection and recognition systems 100, 200, 600 and/or 700 described below can be used in an IP Camera, a connected home device (e.g., a network-connected speaker, a network-connected home appliance, or the like), a drone or unmanned aerial vehicle, in robotics, in automotive-based devices, in mobile devices, and/or in any other suitable devices. Applications can include security cameras, security robots, smart assistants, smart sound bars, intelligent personal assistants, drone applications (e.g., "follow me" or "find me" functions), a personal assistant inside the car (e.g. automatic seat adjustment, automatic seat belt adjustment, automatic entertainment control (e.g., movie, music, etc.), or any other suitable application.

FIG. 1 is a block diagram illustrating an example of a system for detecting and recognizing objects in one or more video frames. The object detection and recognition system 100 receives video frames 104 from a video source 102. The video frames 104 can also be referred to herein as video pictures or pictures. The video frames 104 capture or contain images of a scene, and can be part of one or more video sequences. The video source 102 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 102 can include an Internet Protocol (IP) camera or multiple IP cameras. An IP camera is a type of digital video camera that can be used for surveillance, home security, recreational purposes, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment. In one illustrative example, multiple IP cameras can be located throughout a scene or environment, and can provide the video frames 104 to the object detection and recognition system 100. For instance, the IP cameras can be placed at various fields of view within the scene so that surveillance can be performed based on the captured video frames 104 of the scene. While video frames are used herein as an example of images on which object detection and recognition are performed, one of ordinary skill will appreciate that the object detection and recognition techniques described herein can also be performed on images other than video frames, such as still images captured by a camera, a group of images captured by a camera that are not part of a video, or other suitable images.

In some embodiments, the object detection and recognition system 100 and the video source 102 can be part of the same computing device. In some embodiments, the object detection and recognition system 100 and the video source 102 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The object detection and recognition system 100 processes the video frames 104 to detect and/or track objects in the video frames 104. When object detection and recognition are performed for one or more still images (not video), the objects may be detected, but not tracked. In some cases, the objects can also be recognized by comparing features of the detected and/or tracked objects with enrolled objects that are registered with the object detection and recognition system 100. As described in more detail below, two different video streams can be used when performing object detection and object recognition. For example, a low resolution video stream can be used for object detection (and possibly tracking), while a high resolution video stream can be used for object recognition. The object detection and recognition system 100 outputs objects 106 as detected (and possibly tracked) objects and/or as recognized objects.

Any type of object detection and recognition can be performed by the object detection and recognition system 100. An example of object detection and recognition includes face detection and recognition, where faces of people in a scene captured by video frames (or other images) can be analyzed for detection, possible tracking, and recognition using the techniques described herein. An example face recognition process identifies and/or verifies an identity of a person from a digital image or a video frame of a video clip. In some cases, the features of the face are extracted from the image and compared with features of known faces stored in a database. In some cases, the extracted features are fed to a classifier and the classifier can give the identity of the input features. One illustrative example of a process for recognizing a face includes performing face detection, face tracking, facial landmark detection, face normalization, feature extraction, and face identification and/or face verification. Face detection is a kind of object detection and the only object to be detected is face. While techniques are described herein using face recognition as an illustrative example of object recognition, one of ordinary skill will appreciate that the same techniques can apply to recognition of other types of objects.

Figure 2:
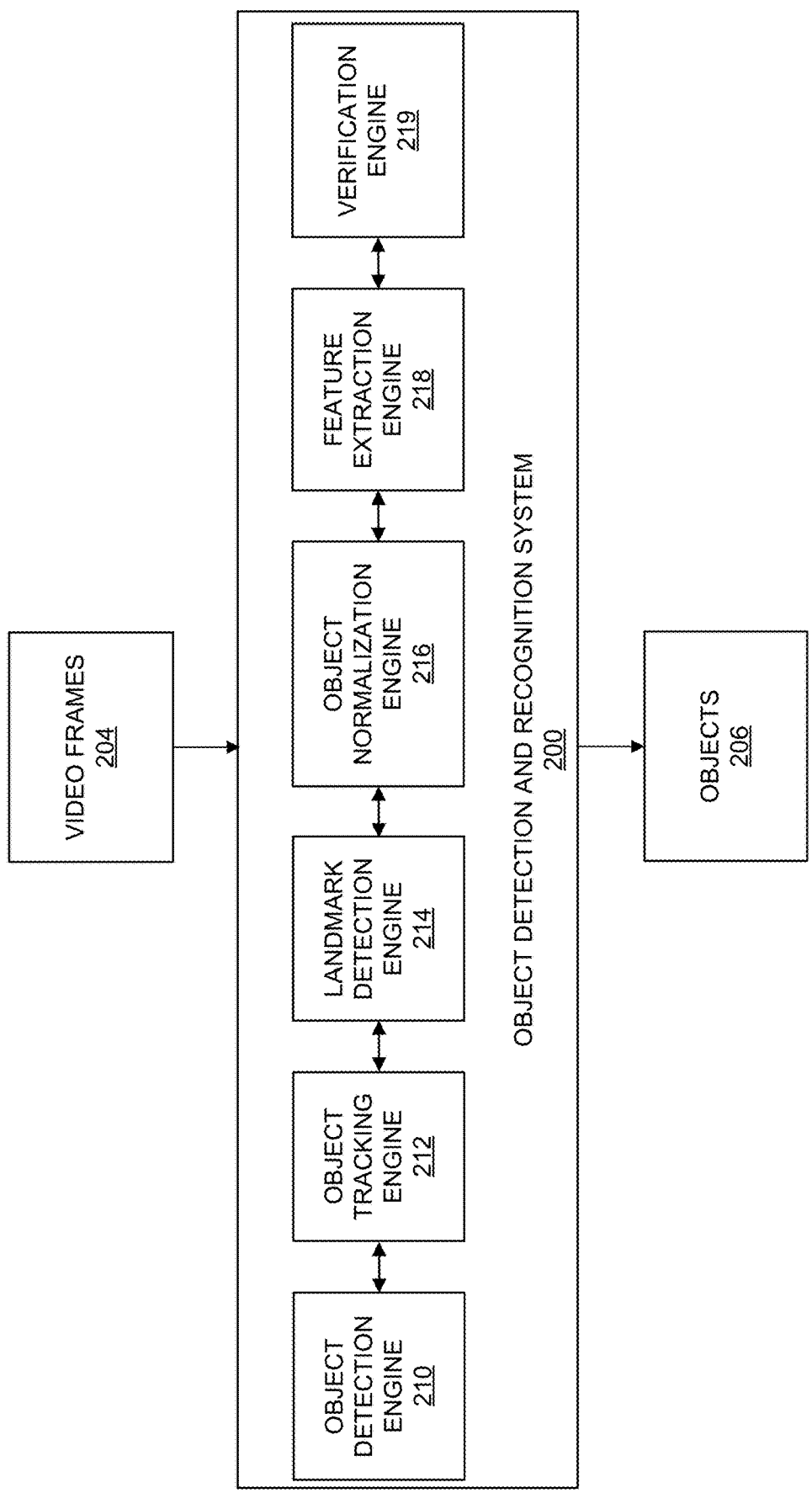
FIG. 2 is an example of an object detection and recognition system that can perform object detection and object recognition, in accordance with some examples.

FIG. 2 is a block diagram illustrating an example of an object detection and recognition system 200. The object detection and recognition system 200 processes video frames 204 and outputs objects 206 as detected, tracked, and/or recognized objects. The object detection and recognition system 200 can perform any type of object recognition. An example of object recognition performed by the object detection and recognition system 200 includes face recognition. However, one of ordinary skill will appreciate that any other suitable type of object recognition can be performed by the object detection and recognition system 200. One example of a full face recognition process for recognizing objects in the video frames 204 includes the following steps: object detection; object tracking; object landmark detection; object normalization; feature extraction; and identification and/or verification. Object recognition can be performed using some or all of these steps, with some steps being optional in some cases.

The object detection and recognition system 200 includes an object detection engine 210 that can perform object detection. Object detection is a technology to detect or locate objects from an image or video frame. Detected objects can be represented using bounding regions that identify the location of the face in the image or video frame. A bounding region of a detected object can include a bounding box, a bounding circle, a bounding ellipse, or any other suitably-shaped region representing a detected object. While examples are described herein using bounding boxes for illustrative purposes, the techniques and systems described herein can also apply using other suitably shaped bounding regions. In one illustrative example, the object detection engine 210 can perform face detection to detect one or more faces in an image or video frame. The object detection engine 210 can provide a bounding box for each detected face. Many object detection algorithms (including face detection algorithms) use template matching techniques to locate objects (e.g., faces) from the images. Various types of template matching algorithms can be used. Other object detection algorithms can also be used by the object detection engine 210, for example machine learning algorithms or other suitable object detection algorithms.

One example template matching algorithm contains four steps, including Haar feature extraction, integral image generation, Adaboost training, and cascaded classifiers. Such an object detection technique performs detection by applying a sliding window across a frame or image. For each current window, the Haar features of the current window are computed from an Integral image, which is computed beforehand. The Haar features are selected by an Adaboost algorithm and can be used to classify a window as a face (or other object) window or a non-face window effectively with a cascaded classifier. The cascaded classifier includes many classifiers combined in a cascade, which allows background regions of the image to be quickly discarded while spending more computation on object-like regions. For example, the cascaded classifier can classify a current window into a face category or a non-face category. If one classifier classifies a window as a non-face category, the window is discarded. Otherwise, if one classifier classifies a window as a face category, a next classifier in the cascaded arrangement will be used to test again. Until all the classifiers determine the current window is a face (or other object), the window will be labeled as a candidate for being a face (or other object). After all the windows are detected, a non-max suppression algorithm is used to group the face windows around each face to generate the final result of detected faces. Further details of such an object detection algorithm is described in P. Viola and M. Jones, "Robust real time object detection," IEEE ICCV Workshop on Statistical and Computational Theories of Vision, 2001, which is hereby incorporated by reference, in its entirety and for all purposes.

Other suitable object detection techniques could also be performed by the object detection engine 210. One other illustrative example of an object detection technique includes example-based learning for view-based face detection, such as that described in K. Sung and T. Poggio, "Example-based learning for view-based face detection," IEEE Patt. Anal. Mach. Intell., volume 20, pages 39-51, 1998, which is hereby incorporated by reference, in its entirety and for all purposes. Another example is neural network-based object detection, such as that described in H. Rowley, S. Baluja, and T. Kanade, "Neural network-based face detection," IEEE Patt. Anal. Mach. Intell., volume 20, pages 22-38, 1998, which is hereby incorporated by reference, in its entirety and for all purposes. Yet another example is statistical-based object detection, such as that described in H. Schneiderman and T. Kanade, "A statistical method for 3D object detection applied to faces and cars," International Conference on Computer Vision, 2000, which is hereby incorporated by reference, in its entirety and for all purposes. Another example is a snowbased object detector, such as that described in D. Roth, M. Yang, and N. Ahuja, "A snowbased face detector," Neural Information Processing 12, 2000, which is hereby incorporated by reference, in its entirety and for all purposes. Another example is a joint induction object detection technique, such as that described in Y. Amit, D. Geman, and K. Wilder, "Joint induction of shape features and tree classifiers," 1997, which is hereby incorporated by reference, in its entirety and for all purposes. Another example object detection technique is a blob detection technique based on background subtraction, which uses one or more statistical mean models to model the background of a scene, and generates blobs using connected component analysis. Any other suitable image-based object detection techniques can be used.

The object detection and recognition system 200 further includes an object tracking engine 212 that can perform object tracking for one or more of the objects detected by the object detection engine 210. In some cases, the object detection and recognition system 200 does not include an object tracking engine 212. For example, for non-video applications, the object detection and recognition system 200 may not use or may not include an object tracking engine 212. Object tracking includes tracking objects across multiple frames of a video sequence or a sequence of images. In one illustrative example, the object tracking engine 212 can track faces detected by the object detection engine 210. For instance, face tracking can be performed to track faces across frames or images. The full object recognition process (e.g., a full face recognition process) is time consuming and resource intensive, and thus it is sometimes not realistic to recognize all objects (e.g., faces) for every frame, such as when numerous faces are captured in a current frame. As used herein, a current frame refers to a frame currently being processed. In order to reduce the time and resources needed for object recognition, object tracking techniques can be used to track previously recognized faces. For example, if a face has been recognized and the object detection and recognition system 200 is confident of the recognition results (e.g., a high confidence score is determined for the recognized face), the object detection and recognition system 200 can skip the full recognition process for the face in one or several subsequent frames if the face can be tracked successfully by the object tracking engine 212.

Any suitable object tracking technique can be used by the object tracking engine 212. Examples of trackers that can be used include optical flow based trackers, template matching based trackers, meanshift trackers, continuously adaptive meanshift (camshift) trackers, Kernelized Correlation Filters (KCF) trackers, Kalman filter based trackers, or other suitable tracker can be used. For example, in some cases, dense optical flow based trackers can estimate the motion vector of pixels (in some cases, all pixels) in a video frame in order to track the movement of the pixels across video frames. For instance, image motion can be recovered at each pixel from spatio-temporal image brightness variations. In some cases, sparse optical flow based trackers (e.g., the Kanade-Lucas-Tomashi (KLT) tracker) can track the location of one or more specific feature points (e.g., one or more corners, textured areas, edges, or other distinct or visual features) in an image.

Template matching based trackers obtain a template of an image feature that is to be tracked across images, and use the template to search for the image feature in the images. For example, as the template slides across an input image, the template is compared or matched to the portion of the image directly under it. The matching is performed by calculating a number that indicates the extent to which the template and the portion of the original image at which the template is currently located are equal (or correlated). The location in the original image that has the greatest correlation (minimum difference from the template) is where the image feature represented by the template is located in the original image. The matching number can depend on the calculation that is used by the template matching algorithm. In one illustrative example, a complete match can be denoted by a 0 (indicating zero difference between the template and the portion of the original image) or a 1 (indicating a complete match).

Meanshift and camshift trackers locate the maxima of a density function to perform tracking. For instance, given a set of points, such as a pixel distribution (e.g., using a histogram backprojected image, which records how well the pixels of a given image fit the distribution of pixels in a histogram model, or other suitable distribution) and a window region, the meanshift tracker can move the window region to the area of maximum pixel density (e.g., to the area with a maximum number of points in the distribution). When an object moves from one image to another, the movement is reflected in pixel distribution (e.g., the histogram backprojected image). The meanshift tracker can then move the window region to the new location with maximum density. A camshift tracker is a modified meanshift tracker that can adapt the window size using a size and rotation of the target object. The camshift tracker can first apply the meanshift operation, and once the meanshift converges, the camshift tracker updates the size of the window (e.g., with the updated size $$s = 2 \times \sqrt{\frac{M_{00}}{256}}).$$

The camshift tracker can also calculate the orientation of a best fitting shape (e.g., ellipse, circle, square, or the like) to the target. The tracker can apply the meanshift technique with a new scaled search window and previous window location. The process is continued until the required accuracy is achieved.

A KCF filter is a correlation filter based trackers, and attempts to identify the best filter taps that maximize the response when correlated with a target template that looks similar in appearance to training data. KCF tracks objects by solving a simple rigid regression problem over training data in the dual form, which allows the use of both multi-dimensional features and non-linear kernels (e.g., Gaussian).

A Kalman filter based object tracker uses signal processing to predict the location of a moving object based on prior motion information. For example, the location of a tracker in a current frame can be predicted based on information from a previous frame. In some cases, the Kalman filter can measure a tracker's trajectory as well as predict its future location(s). For example, the Kalman filter framework can include two steps. The first step is to predict a tracker's state, and the second step is to use measurements to correct or update the state. In this case, the tracker from the last frame can predict its location in the current frame. When the current frame is received, the tracker can use the measurement of the object in the current frame to correct its location in the current frame, and then can predict its location in the next frame. The Kalman filter can rely on the measurement of the associated object(s) to correct the motion model for the object tracker and to predict the location of the tracker in the next frame.

Another illustrative example of an object tracking technique includes a key point technique. Using face tracking as an example, the key point technique can include detecting some key points from a detected face (or other object) in a previous frame. For example, the detected key points can include significant points on face, such as facial landmarks (described in more detail below). The key points can be matched with features of objects in a current frame using template matching. Examples of template matching methods can include optical flow (as described above), local feature matching, and/or other suitable techniques. In some cases, the local features can be histogram of gradient, local binary pattern (LBP), or other features. Based on the tracking results of the key points between the previous frame and the current frame, the faces in the current frame that match faces from a previous frame can be located.

Figure 3:
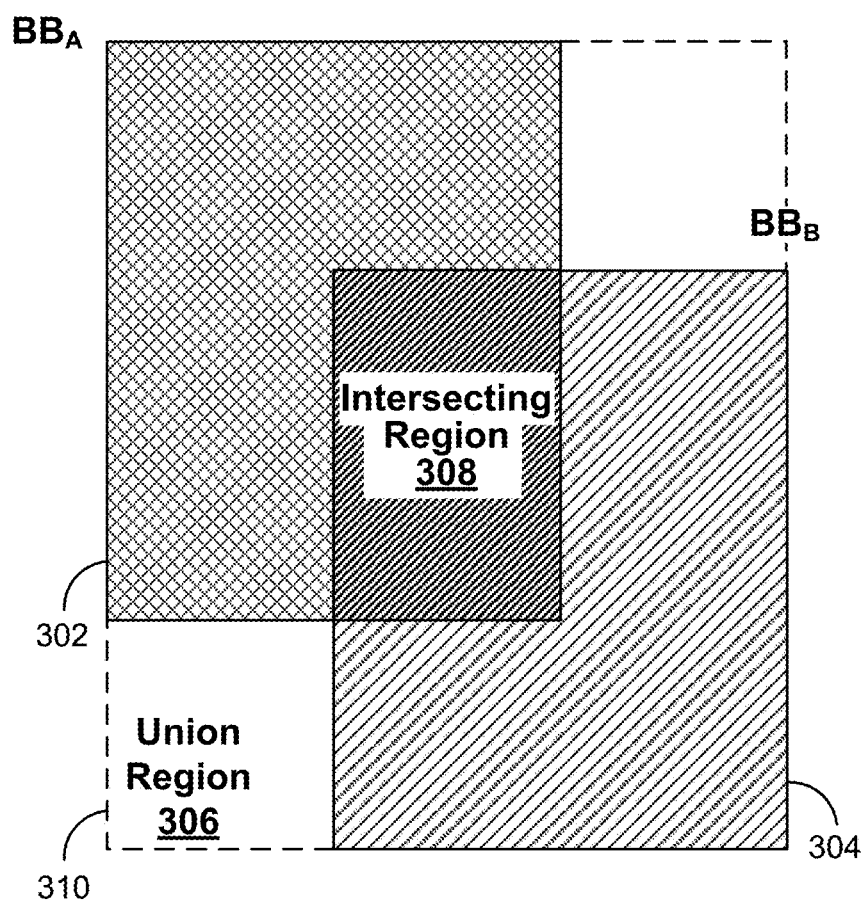
FIG. 3 is a diagram illustrating an example of an intersection and union of two bounding boxes, in accordance with some examples.

Another example object tracking technique is based on the face detection results. For example, the intersection over union (IOU) of face bounding boxes can be used to determine if a face detected in the current frame matches a face detected in the previous frame. FIG. 3 is a diagram showing an example of an intersection I and union U of two bounding boxes, including bounding box $BB_A$ 302 of an object in a current frame and bounding box $BB_B$ 304 of an object in the previous frame. The intersecting region 308 includes the overlapped region between the bounding box $BB_A$ 302 and the bounding box $BB_B$ 304.

The union region 306 includes the union of bounding box $BB_A$ 302 and bounding box $BB_B$ 304. The union of bounding box $BB_A$ 302 and bounding box $BB_B$ 304 is defined to use the far corners of the two bounding boxes to create a new bounding box 310 (shown as dotted line). More specifically, by representing each bounding box with (x, y, w, h), where (x, y) is the upper-left coordinate of a bounding box, w and h are the width and height of the bounding box, respectively, the union of the bounding boxes would be represented as follows:

$$\text{Union}(BB_1, BB_2) = (\min(x_1, x_2), \min(y_1, y_2), (\max(x_1 + w_1 - 1, x_2 + w_2 - 1) - \min(x_1, x_2)), (\max(y_1 + h_1 - 1, y_2 + h_2 - 1) - \min(y_1, y_2)))$$

Using FIG. 3 as an example, the first bounding box $BB_A$ 302 and the second bounding box $BB_B$ 304 can be determined to match for tracking purposes if an overlapping area between the first bounding box $BB_A$ 302 and the second bounding box $BB_B$ 304 (the intersecting region 308) divided by the union 310 of the bounding boxes $BB_A$ 302 and $BB_B$ 304 is greater than an IOU threshold (denoted as $$T_{IOU} < \frac{\text{Area of Intersecting Region 308}}{\text{Area of Union 310}}).$$

The IOU threshold can be set to any suitable amount, such as 50%, 60%, 70%, 75%, 80%, 90%, or other configurable amount. In one illustrative example, the first bounding box $BB_A$ 302 and the second bounding box $BB_B$ 304 can be determined to be a match when the IOU for the bounding boxes is at least 70%. The object in the current frame can be determined to be the same object from the previous frame based on the bounding boxes of the two objects being determined as a match.

In another example, an overlapping area technique can be used to determine a match between bounding boxes. For instance, the first bounding box $BB_A$ 302 and the second bounding box $BB_B$ 304 can be determined to be a match if an area of the first bounding box $BB_A$ 302 and/or an area the second bounding box $BB_B$ 304 that is within the intersecting region 308 is greater than an overlapping threshold. The overlapping threshold can be set to any suitable amount, such as 50%, 60%, 70%, or other configurable amount. In one illustrative example, the first bounding box $BB_A$ 302 and the second bounding box $BB_B$ 304 can be determined to be a match when at least 65% of the first bounding box $BB_A$ 302 or the second bounding box $BB_B$ 304 is within the intersecting region 308.

In some implementations, any of the above-described and/or other tracking techniques can be combined to achieve even more robust tracking results. Any other suitable object tracking (e.g., face tracking) techniques can also be used. Using any suitable technique, face tracking can reduce the face recognition time significantly, which in turn can save CPU bandwidth and power.

Figure 4A:
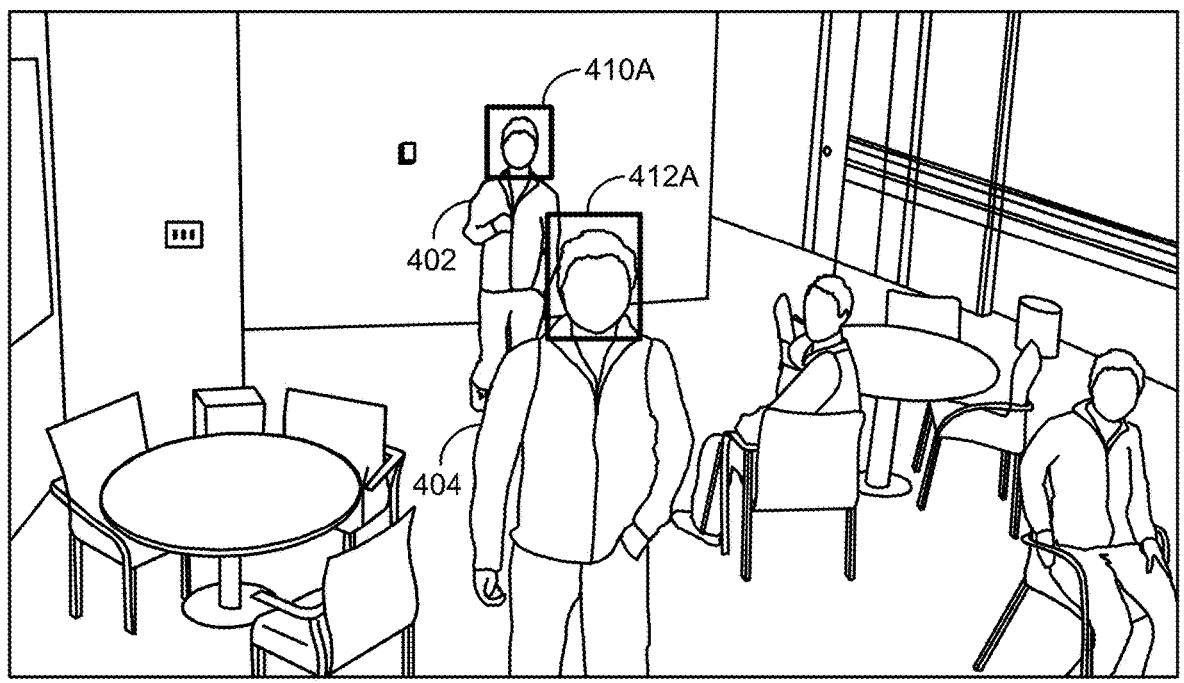
FIG. 4A is an example of a video frame showing detected objects within a scene being tracked, in accordance with some examples.
Figure 4B:
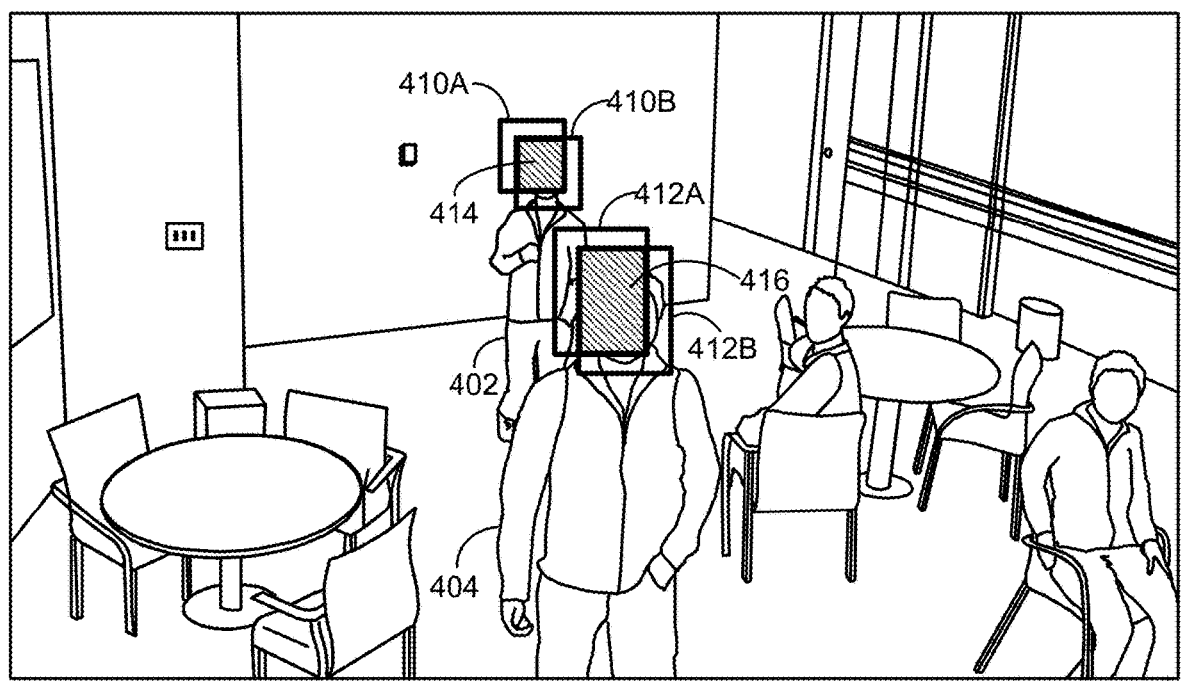
FIG. 4B is an example of a video frame showing detected objects within a scene being tracked, in accordance with some examples.

An illustrative example of face tracking is illustrated in FIG. 4A and FIG. 4B. As noted above, a face can be tracked over a sequence of video frames based on face detection. For instance, the object tracking engine 212 can compare a bounding box of a face detected in a current frame against all the faces detected in the previous frame to determine similarities between the detected face and the previously detected faces. The previously detected face that is determined to be the best match is then selected as the face that will be tracked based on the currently detected face. In some cases, the face detected in the current frame can be assigned the same unique identifier as that assigned to the previously detected face in the previous frame.

The video frames 400A and 400B shown in FIG. 4A and FIG. 4B illustrate two frames of a video sequence capturing images of a scene. The multiple faces in the scene captured by the video sequence can be detected and tracked across the frames of the video sequence, including frames 400A and 400B. The frame 400A can be referred to as a previous frame and the frame 400B can be referred to as a current frame.

As shown in FIG. 4A, the face of the person 402 is detected from the frame 400A and the location of the face is represented by the bounding box 410A. The face of the person 404 is detected from the frame 400A and the location of the face is represented by the bounding box 412A. As shown in FIG. 4B, the face of the person 402 is detected from the frame 400B and the location of the face is represented by the bounding box 410B. Similarly, the face of the person 404 is detected from the frame 400B and its location is represented by the bounding box 412B. The object detection techniques described above can be used to detect the faces.

The persons 402 and 404 are tracked across the video frames 400A and 400B by assigning a unique tracking identifier to each of the bounding boxes. A bounding box in the current frame 400B that matches a previous bounding box from the previous frame 400A can be assigned the unique tracking identifier that was assigned to the previous bounding box. In this way, the face represented by the bounding boxes can be tracked across the frames of the video sequence. For example, as shown in FIG. 4B, the current bounding box 410B in the current frame 400B is matched to the previous bounding box 410A from the previous frame 400A based on a spatial relationship between the two bounding boxes 410A and 410B or based on features of the faces. In one illustrative example, as described above, an intersection over union (IOU) approach can be used, in which case the current bounding box 410B and the previous bounding box 410A can be determined to match if the intersecting region 414 (also called an overlapping area) divided by a union of the bounding boxes 410A and 410B is greater than an IOU threshold. The IOU threshold can be set to any suitable amount, such as 70% or other configurable amount. In another example, an overlapping area technique can be used, in which case the current bounding box 410B and the previous bounding box 410A can be determined to be a match if at least a threshold amount of the area of the bounding box 410B and/or the area the bounding box 410A is within the intersecting region 414. The overlapping threshold can be set to any suitable amount, such as 70% or other configurable amount. In some cases, the key point technique described above could also be used, in which case key points are matched with features of the faces in the current frame using template matching. Similar techniques can be used to match the current bounding box 412B with the previous bounding box 412A (e.g., based on the intersecting region 416, based on key points, or the like).

Returning to FIG. 2, the landmark detection engine 214 can perform object landmark detection. For example, the landmark detection engine 214 can perform facial landmark detection for face recognition. Facial landmark detection can be an important step in face recognition. For instance, object landmark detection can provide information for object tracking (as described above) and can also provide information for face normalization (as described below). A good landmark detection algorithm can improve the object recognition accuracy significantly, such as face or person recognition.

One illustrative example of landmark detection is based on a cascade of regressors method. Using such a method in face recognition, for example, a cascade of regressors can be learned from faces with labeled landmarks. A combination of the outputs from the cascade of the regressors provides accurate estimation of landmark locations. The local distribution of features around each landmark can be learned and the regressors will give the most probable displacement of the landmark from the previous regressor's estimate. Further details of a cascade of regressors method is described in V. Kazemi and S. Josephine, "One millisecond face alignment with an ensemble of regression trees," CVPR, 2014, which is hereby incorporated by reference, in its entirety and for all purposes. Any other suitable landmark detection techniques can also be used by the landmark detection engine 214.

The object detection and recognition system 200 further includes an object normalization engine 216 for performing object normalization. Object normalization can be performed to align objects for better object recognition results. For example, the object normalization engine 216 can perform face normalization by processing an image to align and/or scale the faces in the image for better recognition results. One example of a face normalization method uses two eye centers as reference points for normalizing faces. The face image can be translated, rotated, and scaled to ensure the two eye centers are located at the designated location with a same size. A similarity transform can be used for this purpose. Another example of a face normalization method can use five points as reference points, including two centers of the eyes, two corners of the mouth, and a nose tip. In some cases, the landmarks used for reference points can be determined from facial landmark detection.

In some cases, the illumination of the object images may also need to be normalized. One example of an illumination normalization method is local image normalization. With a sliding window be applied to an image, each image patch is normalized with its mean and standard deviation. The center pixel value is subtracted from the mean of the local patch and then divided by the standard deviation of the local patch. Another example method for lighting compensation is based on discrete cosine transform (DCT). For instance, the second coefficient of the DCT can represent the change from a first half signal to the next half signal with a cosine signal. This information can be used to compensate a lighting difference caused by side light, which can cause part of a face (e.g,. half of the face) to be brighter than the remaining part (e.g., the other half) of the face. The second coefficient of the DCT transform can be removed and an inverse DCT can be applied to get the left-right lighting normalization.

The feature extraction engine 218 performs feature extraction, which is an important part of the object recognition process. An example of a feature extraction process is based on steerable filters. A steerable filter-based feature extraction approach operates to synthesize filters using a set of basis filters. For instance, the approach provides an efficient architecture to synthesize filters of arbitrary orientations using linear combinations of basis filters. Such a process provides the ability to adaptively steer a filter to any orientation, and to determine analytically the filter output as a function of orientation. In one illustrative example, a two-dimensional (2D) simplified circular symmetric Gaussian filter can be represented as:

$$G(x,y) = e^{-(x^2+y^2)},$$

where x and y are Cartesian coordinates, which can represent any point, such as a pixel of an image or video frame. The n-th derivative of the Gaussian is denoted as $G_n$, and the notation $(\ldots)^\theta$ represents the rotation operator. For example, $f^\theta(x, y)$ is the function $f(x, y)$ rotated through an angle $\theta$ about the origin. The x derivative of $G(x,y)$ is:

$$G_1^{0°} = \frac{\partial}{\partial x} G(x, y) = -2xe^{-(x^2+y^2)},$$

and the same function rotated 90° is:

$$G_1^{90°} = \frac{\partial}{\partial x} G(x, y) = -2ye^{-(x^2+y^2)},$$

where $G_1^{0°}$ and $G_1^{90°}$ are called basis filters since $G_1^\theta$ can be represented as $G_1^\theta = \cos(\theta) G_1^{0°} + \sin(\theta) G_1^{90°}$ and $\theta$ is arbitrary angle, indicating that $G_1^{0°}$ and $G_1^{90°}$ span the set of $G_1^\theta$ filters (hence, basis filters). Therefore, $G_1^{0°}$ and $G_1^{90°}$ can be used to synthesize filters with any angle. The $\cos(\theta)$ and $\sin(\theta)$ terms are the corresponding interpolation functions for the basis filters.

Steerable filters can be convolved with face images to produce orientation maps which in turn can be used to generate features (represented by feature vectors). For instance, because convolution is a linear operation, the feature extraction engine 218 can synthesize an image filtered at an arbitrary orientation by taking linear combinations of the images filtered with the basis filters $G_1^{0°}$ and $G_1^{90°}$. In some cases, the features can be from local patches around selected locations on detected faces (or other objects). Steerable features from multiple scales and orientations can be concatenated to form an augmented feature vector that represents a face image (or other object). For example, the orientation maps from $G_1^{0°}$ and $G_1^{90°}$ can be combined to get one set of local features, and the orientation maps from $G_1^{45°}$ and $G_1^{135°}$ can be combined to get another set of local features. In one illustrative example, the feature extraction engine 218 can apply one or more low pass filters to the orientation maps, and can use energy, difference, and/or contrast between orientation maps to obtain a local patch. A local patch can be a pixel level element. For example, an output of the orientation map processing can include a texture template or local feature map of the local patch of the face (or other object) being processed. The resulting local feature maps can be concatenated to form a feature vector for the face image (or other object image). Further details of using steerable filters for feature extraction are described in William T. Freeman and Edward H. Adelson, "The design and use of steerable filters," IEEE Transactions on Pattern Analysis and Machine Intelligence, 13(9): 891-906, 1991, and in Mathews Jacob and Michael Unser, "Design of Steerable Filters for Feature Detection Using Canny-Like Criteria," IEEE Transactions on Pattern Analysis and Machine Intelligence, 26(8):1007-1019, 2004, which are hereby incorporated by reference, in their entirety and for all purposes.

Postprocessing on the feature maps, such as Linear discriminant analysis (LDA) and/or Principal Component Analysis (PCA), can also be used to reduce the dimensionality of the feature size. In order to compensate for possible errors in landmark detection, a multiple scale feature extraction can be used to make the features more robust for matching and/or classification.

The verification engine 219 performs object identification and/or object verification. Face identification and verification is one example of object identification and verification. For example, face identification can be used to identify which person identifier a detected and/or tracked face should be associated with, and face verification can be used to verify if the face belongs to the person to which the face is determined to belong. The same idea also applies to objects in general, where object identification identifies which object identifier a detected and/or tracked object should be associated with, and object verification verifies if the detected/tracked object actually belongs to the object with which the object identifier is assigned. Objects can be enrolled or registered in an enrolled database that contains known objects. In one illustrative example, an owner of a camera containing the object detection and recognition system 200 can register the owner's face and faces of other trusted users. In another illustrative example, an owner of one or more security cameras containing the object detection and recognition system 200 can include a large database of register users that can be provided from any suitable source (e.g., law enforcement or other governmental agency, a private database of registered people, or the like). The enrolled database can be located in the same device as the object detection and recognition system 200, or can be located remotely (e.g., at a remote server that is in communication with the system 200). The database can be used as a reference point for performing object identification and/or object verification. In one illustrative example, object identification and/or verification can be used to authenticate a user to the camera and/or to indicate an intruder or stranger has entered a scene monitored by the camera. In some examples, a confidence score or probability can be generated for each object that is recognized using object recognition, which can indicate a quality of the object recognition result. In one illustrative example, a value between 0 and 1 can be generated for an object recognition result, with a 0 being a low probability (e.g., a 0% likelihood) that the object has the identity determined by object recognition, and a 1 being a high probability (e.g., a 100% likelihood) that the object has the identity determined by object recognition.

Various issues exist when performing object detection and/or object recognition. In terms of face recognition range (distance) and accuracy, video resolution is a dominant factor. For example, there are minimum size requirements (e.g., minimum dimension of a face bounding box, minimum number of pixels between eyes, etc.) needed for face recognition, due at least in part to the fact that features need to be extracted from the face. Furthermore, to recognize a face (or other object) at farther distances, face recognition requires higher resolution images/video (more pixels in smaller face regions). In one illustrative example, if using 1080p video, face recognition can recognize a face up to 10 feet away. However, face recognition may require 4K video to recognize a face in the 20 feet range. In some cases, once an object bounding box is provided from object detection, recognizing an object (e.g., a face or other object) with higher resolution does not sacrifice speed. For example, object recognition can be performed only on the portion of the image that is within a bounding box, thus the size of the region does not change with resolution changes.

In terms of latency, video resolution for object detection (e.g., face detection or other suitable object detection) is a dominant factor. For example, detecting objects (e.g., faces or other objects) in higher resolution images/videos can incur large latency. For instance, an image increases in size as the resolution of the image is increased. The larger an image is, the longer it can take for object detection to process the entire image for detecting one or more objects. Speed is very important for a real-time use cases, such as security camera applications as one illustrative example. For instance, without a good combination of speed and working distance, a face detection and recognition system can fail to recognize a face of a person running with an average speed (e.g., 6 miles per hour, which is approximately 8.8 feet per second) at a critical time.

Figure 5:
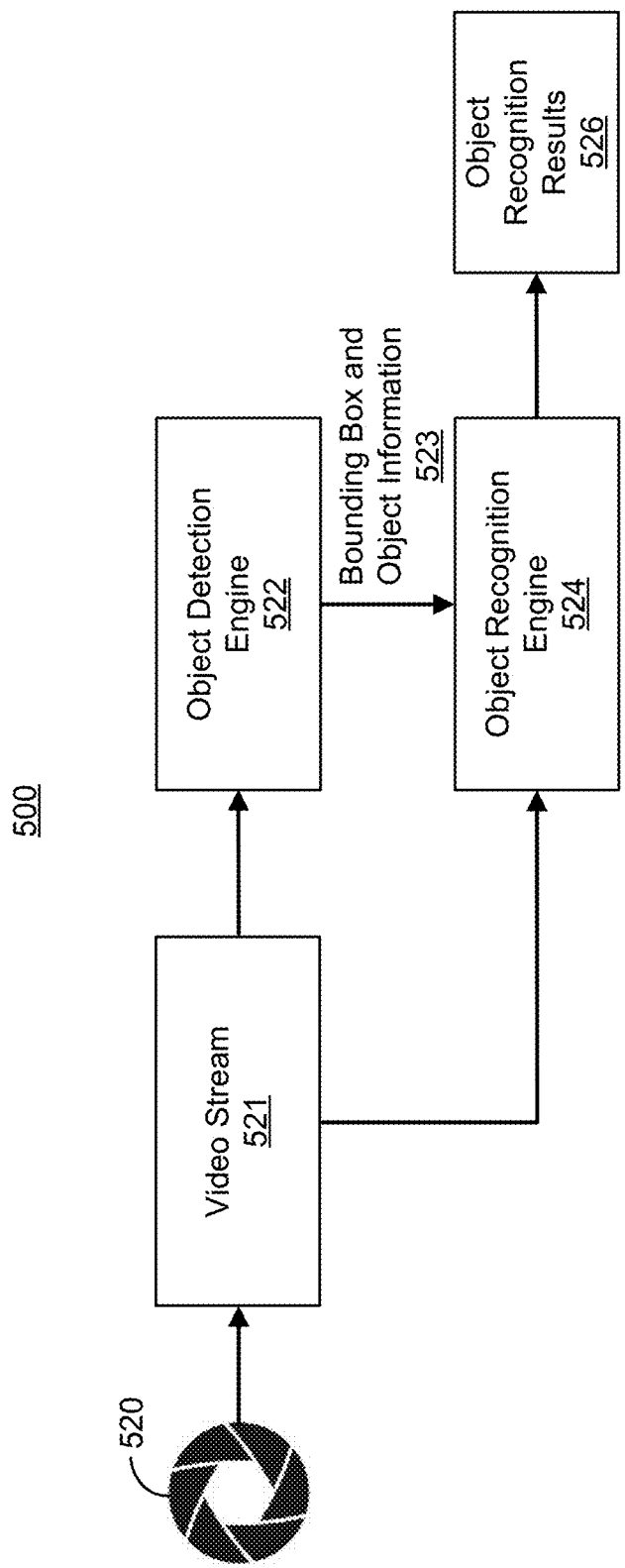
FIG. 5 is a diagram illustrating an example of an object detection and recognition system.

Typical object detection and recognition systems operate using a single stream of video (or other image source) for performing both object detection and object recognition. FIG. 5 is a diagram illustrating an example of an object detection and recognition system 500. A video source 520 provides a video stream 521 for use by both an object detection engine 522 and an object recognition engine 524. After performing object detection, the object detection engine 522 provides bounding box and object information 523 to the object recognition engine 524. The object recognition engine 524 can then produce object recognition results 526. As shown, the same video stream 521 is used for both face detection and for face recognition.

The system 500 is simple but is inflexible, and is thus not optimal for applications that benefit from quality, latency, and range performance. For instance, using a single resolution video stream cannot provide the resolution needed for quality object recognition, while keeping the latency of object detection low enough to prevent large delays. In one example, a high resolution video may be used to provide quality object recognition results, but will lead to large latency when performing object detection. In another example, a low resolution video can allow object detection to be performed without large delays, but can lead to poor object recognition results.

Figure 6:
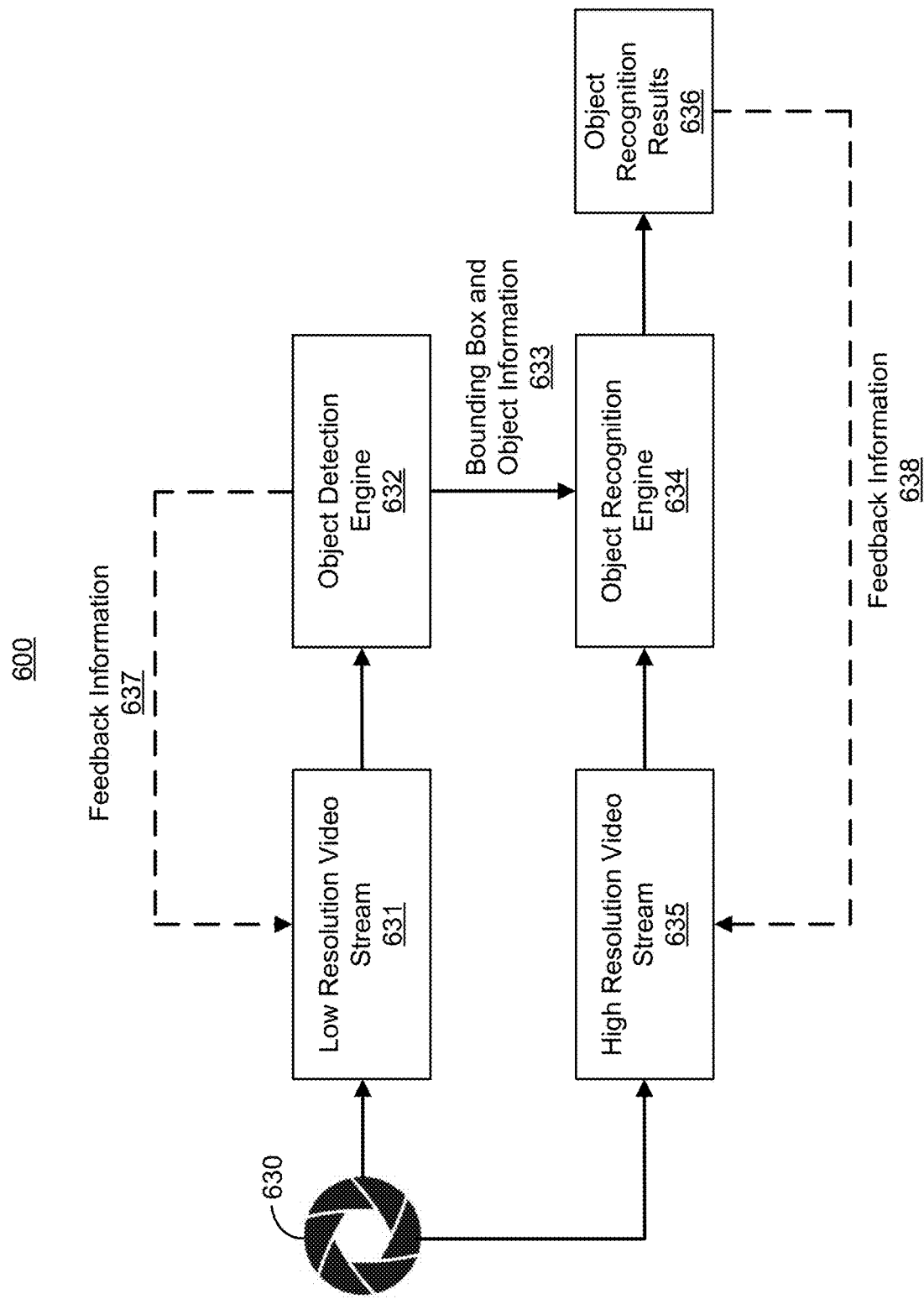
FIG. 6 is a diagram illustrating an example of an adaptive object detection and recognition system, in accordance with some examples.

Systems and methods are described herein for performing adaptive object detection and recognition using images having varying resolutions. Objects can include faces, people, vehicles, animals, and/or other objects. FIG. 6 is a diagram illustrating an example of an adaptive object detection and recognition system 600. While not shown, the object detection and recognition system 600 can include some or all of the components of the object detection and recognition system 200 described above, and may include additional components.

A video source 630 provides a low resolution video stream 631 and a high resolution video stream 635. In some cases, the same source can provide both the low resolution video stream 631 and the high resolution video stream 635, as shown in FIG. 6. In one illustrative example, a computing platform (e.g., the Android™ camera2 framework, or other suitable computing platform) can provide synchronized multi-resolution video streams. For instance, in some examples, the low resolution video stream 631 and the high resolution video stream 635 are based on the same video stream (e.g., captured by the same camera sensor, provided from a common service, or the like). In such examples, the low resolution video stream 631 can be a downscaled version of the high resolution video stream 635. The downscaled version can be obtained by scaling down the high resolution video stream 635 by a certain amount (e.g., by 2, by 4, or other suitable amount). In one illustrative example, the high resolution video stream 635 can include video frames with a 4K resolution. The 4K resolution video frames can be downscaled to lower resolution video frames (e.g., 1080P, 960-540, or the like), which can be provided as the low resolution video stream 631. Such examples can be used, for instance, if a separate low resolution video stream is not available.

In some cases, the low resolution video stream 631 and the high resolution video stream 635 can be provided by different sources (e.g., different video sources, such as different video cameras, different video file storage locations, different video services, or other video sources). For instance, in some examples, the low resolution video stream 631 and the high resolution video stream 635 are based on two different video streams from different sources. For example, the low resolution video stream 631 and the high resolution video stream 635 can be separately-captured videos. In such examples, the high resolution video stream 635 can include video frames with a 4K resolution, and the low resolution video stream 635 can include lower resolution video frames (e.g., 1080P, 960-540, or the like).

The video frames of the low resolution video stream 631 and the high resolution video stream 635 are synchronized with respect to time and content, in that the corresponding frames of the two streams 631 and 635 are captured at the same time and from a same perspective within a scene, thus capturing the same objects in the scene at the same time instances. In one illustrative example, the content of a first frame of the low resolution video stream 631 includes the same content as a first frame of the high resolution video stream 635 (captured at the same time and from a same perspective), except that the first frame of the low resolution video stream 631 has a lower resolution than the first frame of the high resolution video stream 635. In some examples, as noted above, the video frames of low resolution video stream 631 can be downscaled versions of video frames of the high resolution video stream 635. In such examples, a first frame of the low resolution video stream 631 and a first frame of the high resolution video stream 635 are synchronized with respect to time and content. In some examples, as noted above, two different video sources (e.g., video cameras, video storage files, or other suitable content source) can be used to provide the low resolution video stream 631 and the high resolution video stream 635. In such examples, the content can be captured from the same field of view in order to provide synchronized video frames with respect to time and content. For instance, synchronization can be accomplished using a calibrated dual cameras or stereo cameras, where one camera is low resolution and the other camera is high resolution. Because the cameras are calibrated (e.g., in time stamp and space correspondence), the video frames between the two cameras can be synchronized with each other in time and content.

The object detection engine 632 can use the low resolution video stream 631 for detecting one or more objects in the video frames of the low resolution video stream 631. For example, one or more faces in the video frames can be detected by the object detection engine 632. The object detection can be performed over the full frames of the low resolution video stream 631. In one illustrative example, the object detection engine 632 can perform the object detection operations described above with respect to FIG. 1 and FIG. 2 (e.g., the operations performed by the object detection engine 210) in order to detect the one or more objects in the video frames of the low resolution video stream 631.

Figure 10:
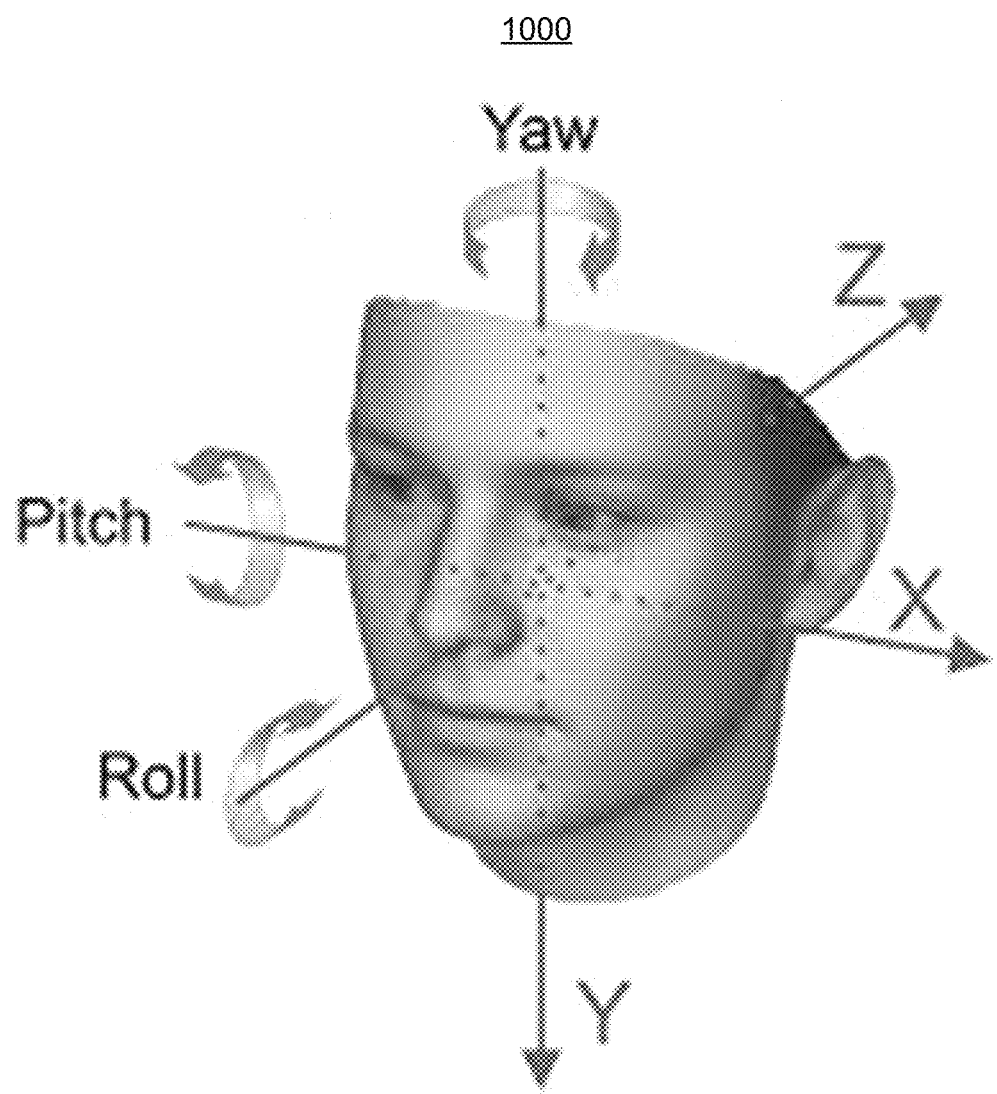
FIG. 10 is a diagram illustrating a face along with roll, yaw, and pitch of the face relative to a camera.

The object detection engine 632 can generate bounding boxes (or other bounding regions) that represent the detected objects. The object detection engine 632 can also generate object information for the detected objects. For example, the bounding box and object information 633 can be generated by the object detection engine 632 based on the object detection performed on the low resolution video frames of the low resolution video stream 631. The object information can include any information that can be used by the object recognition engine 634 for performing object recognition. In some examples, the object information can include object landmarks (e.g., coordinates or other indication of locations of points corresponding to the landmarks) and/or an estimation of angle information (e.g. yaw, roll, pose, or any suitable combination thereof) that indicates an angle at which the object is situated, relative to the camera, in a frame in which the object is detected. In one illustrative example, when an object includes a face, the object landmarks can include facial landmarks, and the angle information can include an angle at which the face is situated relative to the camera when captured. FIG. 10 is a diagram 1000 illustrating a face along with roll, yaw, and pitch of the face relative to a camera. The angle information in the use case of face detection can include the roll, yaw, and pitch of the face relative to the camera.

After the one or more objects (e.g., faces or other objects) are detected using the low resolution video stream 631, the bounding box and object information 633 (e.g., landmarks and angle information and/or other suitable information) can be converted for the high resolution video stream 635 so that the object recognition engine 634 can perform object recognition using the converted bounding box and object information 633 and the high resolution video frames of the high resolution video stream 635. The conversion can be performed by the object detection engine 632 or by the object recognition engine 634. In some examples, to convert the bounding box and object information 633, a ratio or other comparison between the resolution of the high resolution video stream 635 and the resolution of the low resolution video stream 631 can be used to determine by how much to modify a size of the bounding box and coordinates of the landmark information for an object from a low resolution video frame to a high resolution video frame. An example of converting bounding box and object information from a low resolution to a high resolution is provided below with respect to FIG. 8A and FIG. 8B.

The converted object detection results (e.g., converted bounding box and object information 633) can then be used by the object recognition engine 634. The object recognition engine 634 can use video frames of the high resolution video stream 635 and the converted object detection results for recognizing (e.g., determining an identity of) the one or more detected objects in the video frames of the high resolution video stream 635. For example, using the converted object detection results, the objects that were detected in the video frames of the low resolution video stream 631 can be recognized by the object recognition engine 634 in the high resolution video frames of the high resolution video stream 635. The object recognition engine 634 can then produce object recognition results 636 based on the object recognition performed on the high resolution video frames of the high resolution video stream 635. In one illustrative example, the object recognition engine 634 can perform the object recognition operations described above with respect to FIG. 1 and FIG. 2 (e.g., the operations performed by the landmark detection engine 214, the object normalization engine 216, the feature extraction engine 218, and/or the verification engine 219) in order to determine an identity of the one or more detected objects in the video frames of the high resolution video stream 635.

In one illustrative example, one or more faces detected in the low resolution video frames by the object detection engine 632 can be recognized by the object recognition engine in the high resolution video frames of the high resolution video stream 635. The object recognition can be performed for a face (or other object) in a high resolution video frame using only the video data of a high resolution video frame that is within a bounding box for the face (or other object). The bounding box for the face (or other object) in the high resolution video frame can be an upscaled version of the bounding box generated for the face (or other object) by the object detection engine 632, as described in more detail below.

In some examples, feedback from object detection and/or object recognition can be provided for adjusting the resolution of the low resolution video stream 631 for object detection, the high resolution video stream 635 for object recognition, or both the low resolution video stream 631 and the high resolution video stream 635 for object detection and for object recognition. The feedback is optional, and can be omitted or not used in some implementations.

One example of a configuration for feedback is shown in FIG. 6. For instance, as shown in FIG. 6, feedback information 637 from the object detection engine 632 can be used to adjust the resolution of the video frames of low resolution video stream 631 for object detection. In some cases, the feedback information 637 can include the object detection results from the object detection engine 632, an amount of time (or latency) needed to generate the object detection results, a combination thereof, and/or any other suitable feedback from the object detection engine 632. In such examples, the resolution of the low resolution video frames can be adapted (changed or adjusted) based on the object detection results and object detection requirements (e.g., object detection quality, latency of the object detection, and/or other requirement the object detection results are to be in compliance with).

In one illustrative example, the feedback information 637 may indicate that the object detection results from one or more video frames from the low resolution video stream 631 are of low quality (e.g., below a quality threshold). For example, if the resolution drops below a threshold amount, the object detection quality can deteriorate, which can result in intermittent detection, low confidence scores for detection, missed detection altogether, or other possible results. If the feedback information 637 indicates low quality object detection results, a processor or other component (not shown) that is part of or in communication with the adaptive object detection and recognition system 600 can increase the resolution of subsequent video frames of the low resolution video stream 631 so that high quality object detection results can be obtained when object detection is performed on the subsequent video frames. The subsequent video frames are processed by the object detection engine 632 after the video frames from which the feedback 637 is generated.

In another illustrative example, the feedback information 637 can indicate an amount of time (referred to as "latency") it took for object detection to be performed on one or more video frame of the low resolution video stream 631 at a given resolution. The latency can be compared to a latency threshold by a processor or other component that is part of or in communication with the adaptive object detection and recognition system 600. The latency threshold can be set to any suitable amount (e.g., based on a particular application, based on user preference, or other suitable parameter). For instance, in some cases, latency is taken into account when object detection needs to operate in real-time (e.g., at 33 frames per second in a 30 frame per second video, or other suitable real-time rate) or near real-time (e.g., at 28 frames per second in a 30 frame per second video, or other suitable near real-time rate). In such cases, the latency threshold can be set based on a desired rate (e.g., at ⅓₃ per frame when 33 frames per second is a target object detection rate). In some examples, as described above, detected objects can be tracked in order to reduce detection workload and to avoid detection for every frame. In such examples, latency can still be measured on a per frame detection basis (when object detection is performed for a frame) and used as feedback. If the latency is greater than the latency threshold, the processor or other component can decrease the resolution of subsequent video frames of the low resolution video stream 631 so that object detection can be performed more quickly on the subsequent video frames.

In another illustrative example, the feedback information 637 may indicate a quality of object detection results from one or more video frames of the low resolution video stream 631 and a latency required to generate the object detection results. The quality and latency can be evaluated in combination to determine whether to increase, decrease, or maintain a current resolution of the video frames of the low resolution video stream 631. Other factors can also be considered for feedback that can be used to adjust a current resolution. For instance, power consumption and/or a current power or battery level of a device could be another consideration (e.g., for portable or mobile electronic devices, or any other electronic device that operates, at least in part, using a battery). Processing lower resolution video incurs less workload and increases battery life. In one illustrative example, if a power level (e.g., battery level) of a device drops below a power level threshold amount, the resolution of video frames of the low resolution video stream 631 can be decreased. In another illustrative example, if a power consumption of a device becomes greater than a power consumption threshold amount, the resolution of video frames of the low resolution video stream 631 can be decreased.

In some examples, feedback information 638 from the object recognition engine 634 can be used to adjust the resolution of the video frames of the high resolution video stream 635 for object recognition. In some cases, the feedback can include the object recognition results, an indication of the quality of the object recognition results, a combination thereof, and/or any other suitable feedback from the object recognition engine 634. In such examples, the resolution of the high resolution video stream 635 for object recognition can be adapted (changed or adjusted) based on the object recognition results and object recognition requirements (e.g., object recognition quality, latency of the object recognition, and/or other requirement the object recognition results are to be in compliance with).

In one illustrative example, the feedback information 638 may indicate that the object recognition results from one or more video frames from the high resolution video stream 635 are of low quality (e.g., below a quality threshold). For example, if an object recognition result has a confidence score below the quality threshold (e.g., where the quality threshold is set to 0.4, 0.5, 0.6, or other suitable value), it can be determined that the object recognition result has a low quality. In other examples, low recognition rates (e.g., below a recognition rate threshold) due to low quality features, total failure of the object recognition process by the object recognition engine 634, or other condition can cause an object recognition result to be considered as a low quality result. If the feedback information 638 indicates a low quality object recognition result, a processor or other component (not shown) that is part of or in communication with the adaptive object detection and recognition system 600 can increase the resolution of subsequent video frames of the high resolution video stream 635 so that high quality object recognition results can be obtained when object recognition is performed on the subsequent video frames. The subsequent video frames are processed by the object recognition engine 634 after the video frames from which the feedback 638 is generated.

In another illustrative example, the feedback information 638 can indicate an amount of time (latency) that was required to perform object recognition on one or more video frame of the high resolution video stream 635 at a given resolution. The latency can be compared to a latency threshold by a processor or other component that is part of or in communication with the adaptive object detection and recognition system 600. For instance, in some cases, the latency threshold can be set based on a desired rate that can be a real-time rate or a near real-time rate, similar to the latency threshold described above for object detection. For instance, if face recognition is being performed for a real-time function (e.g., a device unlock feature based on face recognition, a surveillance function, or other real-time function), the latency threshold can be set to a real-time rate (e.g., at 1/33 per frame when a real-time rate of 33 frames per second is a target object recognition rate). If the latency is greater than the latency threshold, the processor or other component can decrease the resolution of subsequent video frames of the high resolution video stream 635 so that object recognition can be performed more quickly on the subsequent video frames.

In another illustrative example, the feedback information 638 may indicate a quality of object recognition results from one or more video frames from the high resolution video stream 635 and a latency required to generate the object recognition results. The quality and latency can be evaluated in combination to determine whether to increase, decrease, or maintain a current resolution of the video frames of the high resolution video stream 635. Other factors can also be considered for feedback that can be used to adjust a current resolution. For instance, power consumption and/or a current power or battery level of a device could be another consideration, similar to that described above for object detection.

In some other examples, the object detection results can be used to adjust the resolution of the video frames of the high resolution video stream 635, or the object recognition results can be used to adjust the resolution of the video frames of the low resolution video stream 631, or a combination of the two schemes can be used at the same time to adjust the resolution(s) of the video frames of the low and/or high resolution streams 631, 635 using any of the examples described above or other suitable examples. There is no constraint in what constitutes feedback information, how it is used, and to what it is applied.

Figure 7:
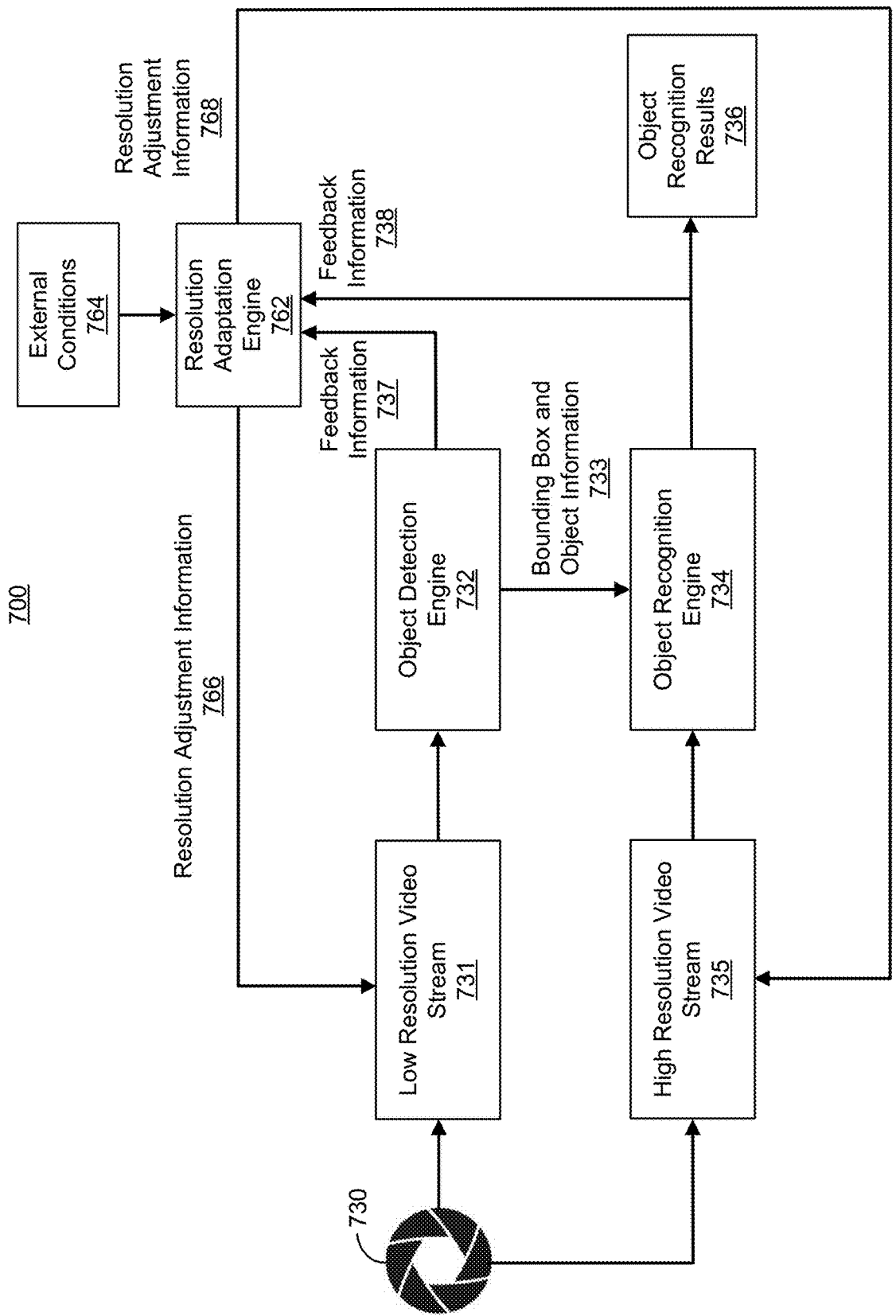
FIG. 7 is a diagram illustrating another example of an adaptive object detection and recognition system, in accordance with some examples.

FIG. 7 is a diagram illustrating another example of an object detection and recognition system 700 that provides feedback information 737 and feedback information 738 for adjusting the low resolution video stream 731 and/or the high resolution video stream 735. While not shown, the object detection and recognition system 700 can include some or all of the components of the object detection and recognition system 200 described above, and may include additional components. The object detection and recognition system 700 can also perform similar object detection and recognition operations as those performed by the object detection and recognition system 600. For example, a video source 730 (or multiple video sources, in some cases) provides a low resolution video stream 731 and a high resolution video stream 735, similar to the video source 630. The object detection engine 732 can perform similar operations as the object detection engine 632, and the object recognition engine 734 can perform similar operations as the object recognition engine 634. After the one or more objects (e.g., faces or other objects) are detected by the object detection engine 732 using the low resolution video stream 731, bounding box and object information 733 (similar to bounding box and object information 633) is generated and can be converted for the high resolution video stream 735 so that the object recognition engine 734 can perform object recognition using the converted bounding box and object information 733 and the high resolution video frames of the high resolution video stream 735 to produce object recognition results 736.

The object detection and recognition system 700 includes a resolution adaptation engine 762 that analyzes feedback information (e.g., feedback information 737 and/or feedback information 738) to determine whether to adjust the low resolution video stream 731, the high resolution video stream 735, or both the low resolution video stream 731 and the high resolution video stream 735. The feedback information used by the resolution adaptation engine 762 can be based on the objection detection results, the object recognition results, and/or based on external conditions 764. For instance, the feedback information 737 can include object detection results provided to the resolution adaptation engine 762 from the object detection engine 732. In some examples, the feedback information 737 can include other suitable information. In one example, the feedback information 737 can also include latency information indicating an amount of time that was required to perform object detection on one or more video frame of the low resolution video stream 731 at a given resolution. The feedback information 738 can include object recognition results provided to the resolution adaptation engine 762 from the object recognition engine 734. In some examples, the feedback information 738 can include other suitable information. In one example, the feedback information 738 can also include latency information indicating an amount of time it took for object recognition to be performed on one or more video frame of the high resolution video stream 735 at a given resolution. The external conditions 764 can include any condition that can affect the object detection and/or object recognition results, such as lighting conditions, a power level of a device, one or more power requirements of a device, accuracy requirements of object detection and/or object recognition, any combination thereof, and/or any other suitable conditions.

In some examples, the feedback information 737, the feedback information 738, and the external conditions 764 can be collectively used to determine whether and how to adapt the low resolution video stream 731 and/or the high resolution video stream 735. For instance, based on the object detection results, the object recognition results, and/or the external conditions 764, the resolution adaptation engine 762 can generate resolution adjustment information 766 used for adjusting the resolution of video frames of the low resolution video stream 731 for object detection. In one illustrative example, the resolution of video frames of the low resolution video stream 731 can be increased when object detection results have a low quality, as described above with respect to FIG. 6. In another illustrative example, the resolution of video frames of the low resolution video stream 731 can be decreased when an amount of time (latency) it took to perform object detection on one or more of the low resolution video frames is greater than a latency threshold, as described above with respect to FIG. 6. In another illustrative example, the resolution of video frames of the low resolution video stream 731 can be increased when an amount of time (latency) it took to perform object detection on one or more of the low resolution video frames is below a low latency threshold. For example, if the object detection results are being generated for the low resolution video frames too quickly (e.g., based on the low latency threshold), the resolution of the low resolution video stream 731 can be increased so that higher quality object detection results can be achieved. In another example, if the quality of face detection results are above a high quality threshold, the resolution of the low resolution video stream 731 can be decreased in order to reduce power consumption.

The resolution adaptation engine 762 can also generate resolution adjustment information 768 used for adjusting the resolution of the high resolution video stream 735 for object recognition, which can lead to more optimal object recognition results 736. In one illustrative example, the resolution of video frames of the high resolution video stream 735 can be increased when object recognition results have a low quality, as described above with respect to FIG. 6. In another illustrative example, the resolution of video frames of the high resolution video stream 735 can be decreased when an amount of time (latency) it took to perform object recognition on one or more of the high resolution video frames is greater than a latency threshold, as described above with respect to FIG. 6. In another illustrative example, the resolution of video frames of the high resolution video stream 735 can be increased when an amount of time (latency) it took to perform object recognition on one or more of the high resolution video frames is below a low latency threshold. For example, if the object recognition results are being generated for the high resolution video frames too quickly (e.g., based on the low latency threshold), the resolution of the high resolution video stream 735 can be increased so that higher quality object recognition results can be achieved. In another example, if the quality of face recognition results are above a high quality threshold (e.g., 0.8, 0.9, 0.95, or other suitable value), the resolution of the high resolution video stream 735 can be decreased in order to reduce power consumption. Other examples taking into account the external conditions 764 are described below.

The above-described feedback-based resolution adaptation can be performed dynamically (e.g., by the system 600 or the system 700) to adjust the low and high resolution video streams (e.g., the low resolution stream 631 and/or the high resolution stream 635, or the low resolution stream 731 and/or the high resolution stream 735) for object detection and recognition, respectively. For example, the general concept is to have different resolutions of input video for face detection and face recognition. However, the feedback-based resolution adaptation allows an object detection and recognition system to adapt the resolutions of either or both of the input videos to maximize performance. By adapting the low resolution video stream for object detection and/or the high resolution video stream for object recognition, the object detection and recognition system can provide a trade-off according to latency, accuracy, and other requirements (e.g., power consumption among others) in different use cases or conditions.

In one example use case, low light conditions may be present, which may lead to poor object detection results being provided by the object detection engine 632. In such cases, the object detection and recognition system 600 can automatically increase the video resolution of the low resolution video stream 631 so that the object detection engine 632 can perform more accurate object detection. In such an example, when lighting conditions get worse, leading to a drop in face detection accuracy, an object detection and recognition system can increase the resolution of the low resolution video to improve object detection.

In another illustrative example, if face recognition is performing well (e.g., face recognition results are above a high quality threshold), an object detection and recognition system can lower the resolution of the high resolution video used for object recognition to reduce power consumption. Such a modification of the video used for face recognition can be beneficial due to high resolution video taking more power to generate. In yet another illustrative example, if face detection is performing well, but face recognition accuracy is low, an object detection and recognition system can increase the resolution of the high resolution video used for object recognition.

Figure 8A:
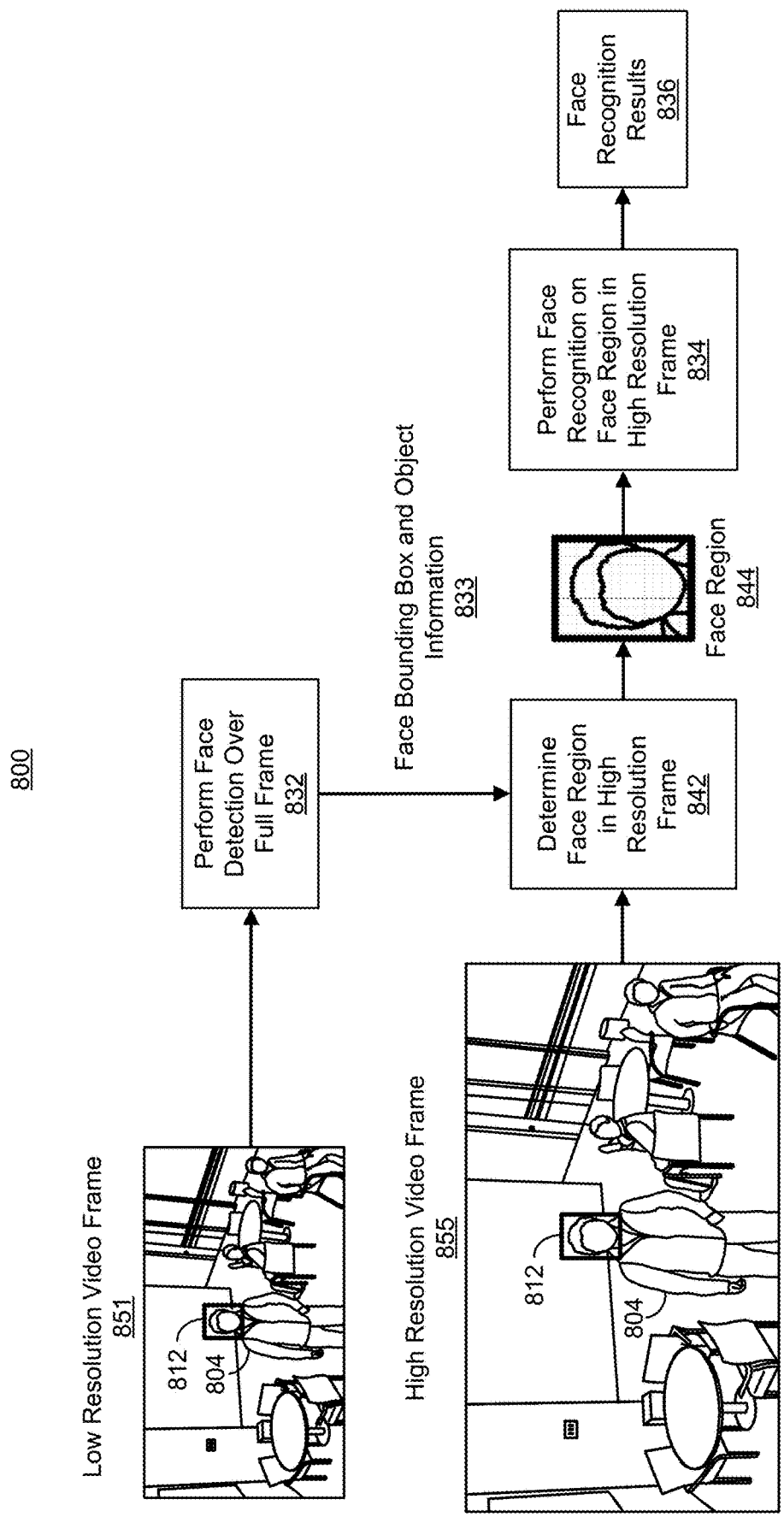
FIG. 8A and FIG. 8B are diagrams illustrating an example of an adaptive object detection and recognition process, in accordance with some examples.

FIG. 8A is a diagram illustrating an example of a process 800 of performing adaptive object detection and recognition. The process 800 can be performed by the object detection and recognition system 600 or by the object detection and recognition system 700 described above. A low resolution video frame 851 is provided as part of a low resolution video stream (not shown), and a high resolution video frame 855 is provided as part of a high resolution video stream (not shown). In one illustrative example, the low resolution video frame 851 has a resolution of 960×540, and the high resolution video frame 855 has a resolution of 3840×2160. However, one of ordinary skill will appreciate that the low resolution video frame 851 and the high resolution video frame 855 can be of any resolutions. As described in the examples provided above, the low resolution video frame 851 and the high resolution video frame 855 are synchronized with respect to time and content, and thus capture the same objects in the scene at the same time instances. For instance, as shown in FIG. 8A, the low resolution video frame 851 has the same content as the high resolution video frame 855, but has a lower resolution than the high resolution video frame 855.

At block 832, the process 800 performs face detection over the full low resolution video frame 851 to detect the face 812 of the person 804. While faces are used as an example of objects in the example of FIG. 8A and FIG. 8B, one of ordinary skill will appreciate that any other object can be recognized by the process 800. In one illustrative example, the object detection engine 632 can perform the object detection operations described above with respect to FIG. 1 and FIG. 2 (e.g., the operations performed by the object detection engine 210) in order to detect the face 812 in the low resolution video frame 851. The process 800 can also generate a bounding box (as shown in FIG. 8A) and object information 833 for the detected face 812. The object information can include any information that can be used for performing object recognition. In one illustrative example, the object information can include facial landmarks (e.g., as face part coordinates scaled in both x and y directions) and/or an estimation of angle information (e.g. yaw, roll, pose, or any suitable combination thereof) of the face, and/or other suitable information.

Figure 8B:
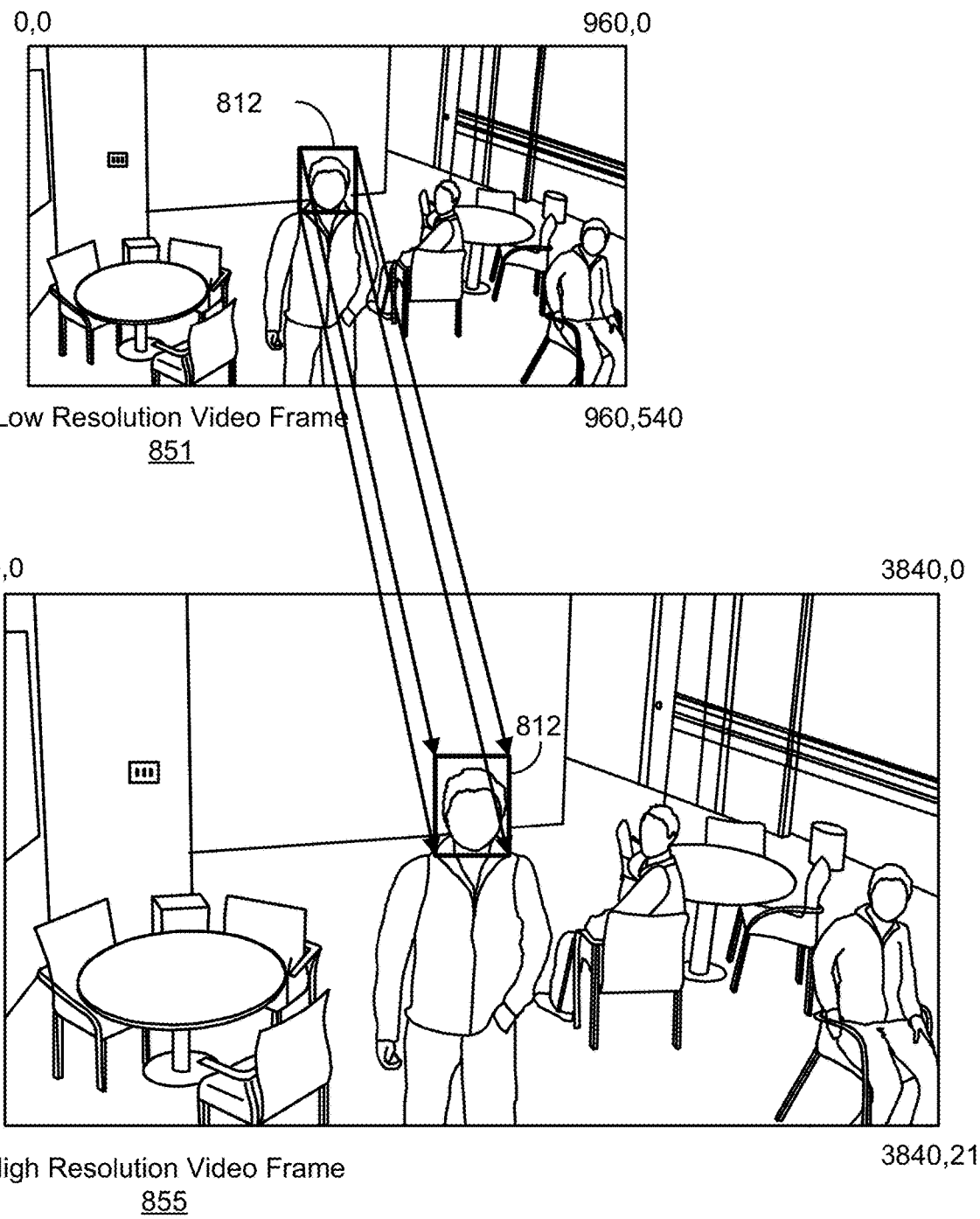

After the face 812 is detected at block 832, the bounding box and object information 833 can be converted for the high resolution video frame 855 so that object recognition can be performed using the high resolution video frame 855. As described above, a ratio between the resolution of the high resolution video frame 855 and the resolution of the low resolution video frame 851 can be used to determine how much to increase the bounding box and landmark information for an object from a low resolution video frame to a high resolution video frame. FIG. 8B is a diagram illustrating an example of conversion of the bounding box and landmark information for the face 812 from the low resolution video frame 851 to the high resolution video frame 855. In the example, the low resolution video frame 851 is at a resolution of 960×540 and the high resolution video frame 855 is at a resolution of 3840×2160. Using such example resolutions, the width and height of each of the low resolution and high resolution frames 851, 855 have the same ratio. For example, the width ratio (WidthRatio) is equal to 4 (3840/960=4), and the height ratio (HeightRatio) is also equal to 4 (2160/540=4). Based on the width and height ratios, a ratio multiple of 4 is used for all bounding box points and all points of the face landmarks when going from the low resolution to the high resolution. For example, the following calculation (with "ratio" being the ratio multiple, such as the ratio multiple of 4 from the example above) can be performed for the corner points of the bounding box:

$p$FaceInfoHiRes.sLeftTop.nLocX=$p$FaceInfoLoRes.sLeftTop.nLocX*ratio;

$p$FaceInfoHiRes.sLeftTop.nLocY=$p$FaceInfoLoRes.sLeftTop.nLocY*ratio;

$p$FaceInfoHiRes.sRightTop.nLocX=$p$FaceInfoLoRes.sRightTop.nLocX*ratio;

$p$FaceInfoHiRes.sRightTop.nLocY=$p$FaceInfoLoRes.sRightTop.nLocY*ratio;

$p$FaceInfoHiRes.sLeftBottom.nLocX=$p$FaceInfoLoRes.sLeftBottom.nLocX*ratio;

$p$FaceInfoHiRes.sLeftBottom.nLocY=$p$FaceInfoLoRes.sLeftBottom.nLocY*ratio;

$p$FaceInfoHiRes.sRightBottom.nLocX=$p$FaceInfoLoRes.sRightBottom.nLocX*ratio;

$p$FaceInfoHiRes.sRightBottom.nLocY=$p$FaceInfoLoRes.sRightBottom.nLocY*ratio;

with the x- and y-coordinates of the top-left corner of the bounding box being denoted as sLeftTop.nLocX and sLeftTop.nLocY, the x- and y-coordinates of the top-right corner of the bounding box being denoted as sRightTop.nLocX and sRightTop.nLocY, the x- and y-coordinates of the bottom-left corner of the bounding box being denoted as sLeftBottom.nLocX and sLeftBottom.nLocY, and the x- and y-coordinates of the bottom-right corner of the bounding box being denoted as sRightBottom.nLocX and sRightBottom.nLocY.

The following calculation can also be performed for right eye and left eye facial landmark points:

$p$FaceInfoHiRes.sLandmarkLocation.sLeftEye.nLocX=
$p$FaceInfoLowRes.sLandmarkLocation.sLeftEye.nLocX*ratio $p$FaceInfoHiRes.sLandmarkLocation.sLeftEye.nLocY=
$p$FaceInfoLowRes.sLandmarkLocation.sLeftEye.nLocY*ratio $p$FaceInfoHiRes.sLandmarkLocation.sRightEye.nLocX=
$p$FaceInfoLowRes.sLandmarkLocation.sRightEye.nLocX*ratio $p$FaceInfoHiRes.sLandmarkLocation.sRightEye.nLocY=
$p$FaceInfoLowRes.sLandmarkLocation.sRightEye.nLocY*ratio In one illustrative example, the points for the left and right eyes can be the points at the centers of the pupils. In some cases, similar calculations can also be performed for other landmarks, such as the tip of a nose, the corners of the mouth, and/or other suitable landmarks.

As illustrated above, certain points of the bounding box (e.g., the corner points) and certain points defining one or more landmarks on the face are multiplied by the resolution width/height ratio in order to convert the detection results from the low resolution to the high resolution. Based on the conversion, the face bounding box and object information can include a scaled bounding box and scaled landmarks. Returning to FIG. 8A, the scaled object detection results (e.g., scaled bounding box and landmarks, along with the object information) can then be used to determine, at block 842, a face region 844 in the high resolution video frame 855 that corresponds to the detected face. The face region 844 can be determined based on the scaled bounding box generated for the detected face 812. In some examples, determining the face region 844 in the high resolution video frame 855 can include determining a region of interest (ROI) that the object recognition engine can focus on within the high resolution video frame 855 when performing face recognition (or other type of object recognition). In such examples, the ROI within the high resolution video frame 855 is defined by the scaled bounding box generated for the detected face (e.g., based on the scaled coordinates of the scaled bounding box). Further, in such examples, the high resolution video frame 855 is not cropped to generate a cropped frame. Rather, the object recognition engine can focus on the ROI (e.g., shown as face region 844) within the high resolution video frame 855 that corresponds to the scaled bounding box generated for the detected face. In some examples, determining the face region in the high resolution video frame 855 can include cropping the high resolution video frame 855 in order to generate a cropped high resolution frame (e.g., shown as face region 844). For instance, the high resolution video frame 855 can be cropped to include only the portion of the high resolution video frame 855 encompassed by the scaled bounding box.

At block 834, the process 800 can then perform object recognition on the face region 844 of the high resolution video frame 855 to produce face recognition results 836. In one illustrative example, the face recognition can be performed by implementing the object recognition operations described above with respect to FIG. 1 and FIG. 2 (e.g., the operations performed by the landmark detection engine 214, the object normalization engine 216, the feature extraction engine 218, and/or the verification engine 219) in order to determine an identity of the detected face 812 in the high resolution video frame 855.

Using a combination of synchronized low and high resolution videos, as described above, can solve the above-noted problems associated with performing object detection and recognition using a single stream of images. For example, using low resolution video for detecting objects (e.g., faces or other objects) significantly improves the speed of object detection, and using high resolution video for recognizing objects greatly improves the quality and distance-capabilities of object recognition. Thus, by using low resolution video for detecting the objects and using synchronized high resolution video for recognizing the objects, object detection and recognition systems can increase the maximum distance for recognizing the objects while maintaining the speed/latency similar to that achieved using low resolution video. Using faces as an example of objects, by using low resolution video for face detection and high resolution video for face recognition, face detection and recognition systems can detect and recognize faces at longer distances with low latency. Recognizing faces (or other objects) at far distances with greater accuracy and speed provides a significant benefit in various devices and/or applications, such as in security cameras, robot applications (e.g., security robots, or other robot applications), smart sound speakers (e.g., a smart sound bar), smart televisions, smart assistant devices, drones, personal assistant applications inside a car or other automobile, among many others.

FIG. 9 is a flowchart illustrating an example of a process 900 of performing object recognition for video frames using the techniques described herein. At block 902, the process 900 includes obtaining one or more video frames of a first video. The one or more video frames have a first resolution and include one or more objects. In one illustrative example, the one or more objects include one or more faces. However, the process 900 can be performed for any object in one or more video frames.

At block 904, the process 900 includes performing object detection to detect the one or more objects in the one or more video frames of the first video. For instance, the one or more objects are detected based on the object detection being performed on the one or more video frames of the first video. In some examples, if the one or more objects include one or more faces, the object detection can include face detection for detecting the one or more faces in the one or more video frames using the techniques described above. Other forms of object detection can also be performed for other types of objects.

At block 906, the process 900 includes obtaining one or more video frames of a second video. The one or more video frames of the second video include the one or more objects. The one or more video frames of the second video also have a second resolution that is greater than the first resolution. In one illustrative example, the one or more video frames of the first video have a resolution of 960×540, and the one or more video frames of the second video have a resolution of 3840×2160. The first video and second video can have other resolutions in other examples.

At block 908, the process 900 includes performing an object recognition process on the one or more objects. The object recognition process is performed on the one or more video frames of the second video. For example, an identity of the one or more objects detected in the one or more video frames of the first video can be determined based on the results of the object recognition process performed on the one or more video frames of the second video. In some examples, if the one or more objects include one or more faces, the object recognition process can include face recognition for recognizing the one or more faces in the one or more video frames using the techniques described above. Other forms of object recognition can also be performed for other types of objects.

At block 908, the process 900 includes obtaining feedback associated with one or more of the object detection performed on the one or more video frames of the first video or the object recognition process performed on the one or more video frames of the second video. For example, the feedback can be based on performance of the object detection, performance of the object recognition process, or based on performance of both the object detection and object recognition processes. At block 910, the process 900 includes adjusting one or more of a resolution of the first video or a resolution of the second video based on the feedback. For example, the resolution of the first video, the resolution of the second video, or both the resolution of the first video and the second video can be adjusted based on the feedback.

In one illustrative example, the process 900 can include obtaining feedback associated with the object detection performed on the one or more video frames of the first video. The process 900 can include adjusting the resolution of the first video based on the feedback. The process 900 can then include detecting at least one object in a subsequent video frame of the first video after the resolution of the first video is adjusted. For example, the at least one object is detected based on the object detection being performed on the subsequent video frame having the adjusted resolution.

In another illustrative example, the process 900 can include obtaining feedback associated with the object recognition process performed on the one or more video frames of the second video, and adjusting the resolution of the second video based on the feedback. The process 900 can include performing the object recognition process on at least one object in a subsequent video frame of the second video after the resolution of the second video is adjusted, in which case the subsequent video frame of the second video has the adjusted resolution. For example, the identity of the at least one object can be determined based on the object recognition process being performed on the subsequent video frame having the adjusted resolution.

In another illustrative example, the process 900 can include adjusting the resolution of the first video to a first adjusted resolution based on the feedback, and adjusting the resolution of the second video to a second adjusted resolution based on the feedback. In some cases, the feedback can be associated with the object detection performed on the one or more video frames of the first video. In some cases, the feedback can be associated with the object recognition process performed on the one or more video frames of the second video. In some cases, the feedback can be associated with both the object detection performed on the one or more video frames of the first video and the object recognition process performed on the one or more video frames of the second video, in which case the feedback from both object detection (performed on the first video) and object recognition (performed on the second video) can be used to adjust the resolution of the first video and the resolution of the second video. The process 900 can further include detecting at least one object in a subsequent video frame of the first video after the resolution of the first video is adjusted, in which case the at least one object is detected based on object detection being performed on the subsequent video frame having the first adjusted resolution. The process 900 can also include performing the object recognition process on the at least one object detected in the subsequent video frame of the first video. For example, the identity of the at least one object can be determined based on the object recognition process being performed on a subsequent video frame of the second video after the resolution of the second video is adjusted, in which case the subsequent video frame of the second video has the second adjusted resolution.

As noted previously, the feedback can be associated with the object detection performed on the one or more video frames of the first video, the object recognition process performed on the one or more video frames of the second video, or both the object detection and object recognition. In some cases, the feedback is based on a latency of the object detection, a quality of results from the object detection performed on one or more objects in the one or more video frames of the first video, a latency of the object recognition process, a quality of results from the object recognition process performed on one or more objects in the one or more video frames of the second video, or any suitable combination thereof. The feedback can also be based on any other suitable information related to the object detection and/or object recognition, and/or other external conditions (e.g., external conditions 764 described above). For instance, in some implementations, external information (e.g., external conditions 764, such as lighting conditions, a power level of a device, one or more power requirements of a device, accuracy requirements of object detection and/or object recognition, and/or any other suitable conditions) can also be used to adjust the resolution of the first video and/or the resolution of the second video. Various additional examples are described above with respect to FIG. 6 and FIG. 7.

In some examples, adjusting one or more of the resolution of the first video or the resolution of the second video based on the feedback can include determining, based on the feedback, that a latency of the object detection performed on the one or more video frames of the first video is greater than a latency threshold. Adjusting one or more of the resolution of the first video or the resolution of the second video can further include reducing a resolution of at least one video frame of the first video based on the latency of the object detection being greater than the latency threshold.

In some examples, adjusting one or more of the resolution of the first video or the resolution of the second video based on the feedback can include determining, based on the feedback, that a confidence score generated for the one or more objects by the object recognition process is less than a quality threshold. Adjusting one or more of the resolution of the first video or the resolution of the second video can further include increasing a resolution of at least one video frame of the second video based on the confidence score being less than the quality threshold.

Using any of the examples above or other examples, once the resolution of the first video is adjusted for subsequent video frames of the first video, the object detection process can be performed on the subsequent video frames having the adjusted resolution. Similarly, once the resolution of the second video is adjusted for subsequent video frames of the second video, the object recognition process can be performed on the subsequent video frames having the adjusted resolution.

In some examples, the process 900 includes determining object information associated with the one or more detected objects based on the object detection performed on the one or more video frames of the first video. The object information can include a bounding region (e.g., a bounding box, a bounding ellipse, or other suitable bounding region) for each object, information defining one or more landmarks on the object, information defining an angle, orientation, and/or pose of the object, and/or other suitable information that can be used for performing the object recognition process. In such examples, the process 900 further includes modifying the object information from the first resolution to the second resolution, and performing the object recognition process on the one or more video frames of the second video using the modified object information.

In some examples, modifying the object information from the first resolution to the second resolution includes upscaling the object information from the first resolution to the second resolution. As noted above, object information associated with a detected object can include information defining a bounding region generated for the detected object. In some cases, modifying the object information from the first resolution to the second resolution includes upscaling the bounding region from a first size to a second size. The second size is based on a ratio between the first resolution and the second resolution. For instance, as described above, if the high resolution video is 3840×2160 and the low resolution video is 960×540, the ratio between the first resolution and the second resolution is 4 (3840/960=4 and 2160/540=4). In such an example, the bounding box can be upscaled by a factor of 4. In some cases, only certain points of the bounding region can be upscaled using the ratio, such as the four corners of the bounding region. In some examples, performing the object recognition process on the one or more video frames of the second video using the modified object information includes performing the object recognition process on a region of the one or more video frames of the second video corresponding to the upscaled bounding region. In one illustrative example, a region of interest (ROI) can be defined in a video frame of the second video based on the bounding region. For instance, the ROI can include the portion of the video frame that is contained by the bounding region. In another illustrative example, a video frame of the second video can be cropped to remove any part of the video frame that is outside of the bounding region, leaving the portion of the video frame that is within the bounding region to be used for the object recognition process.

As noted above, object information associated with a detected object can include information defining one or more landmarks on the detected object. For instance, using a face as an example, landmarks can include the eyes, the nose, the corners of the mouth, and/or other prominent features of the face. In some cases, modifying the object information from the first resolution to the second resolution includes changing a location of a landmark from a first location to a second location. In such cases, the second location is based on a ratio between the first resolution and the second resolution. As described above, if the high resolution video is 3840×2160 and the low resolution video is 960×540, the ratio between the first resolution and the second resolution is 4 (3840/960=4 and 2160/540=4). In such an example, each landmark can be upscaled by a factor of 4.

In some examples, the first video and the second video are time synchronized. For instance, the first video and the second video can be synchronized in time and in content. In such examples, the corresponding images of the two videos are captured at the same time and from a same perspective and/or come from the same source such as a camera sensor, in which case the video frames of the first and second videos capture the same objects in a scene at the same time instances. For instance, a first frame of the first video has the same content as a first frame of the second video. In some cases, the first video and the second video are obtained from two different video streams, and are synchronized in time. In some cases, the first video is a downscaled version of the second video. For instance, the first video can be obtained by downscaling the second video from the second resolution to the first resolution.

In some examples, the process 900 may be performed by a computing device or an apparatus. In one illustrative example, the process 900 can be performed by the object detection and recognition system 600 shown in FIG. 6 and/or the object detection and recognition system 700 shown in FIG. 7. In some cases, the computing device or apparatus may include a processor, microprocessor, microcomputer, or other component of a device that is configured to carry out the steps of process 900. In some examples, the computing device or apparatus may include a camera configured to capture video data (e.g., a video sequence) including video frames. For example, the computing device may include a camera device (e.g., an IP camera or other type of camera device) that may include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 900 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The object detection and recognition techniques discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

As noted above, one of ordinary skill will appreciate that the less than ("<") and greater than (">") symbols or terminology used herein can be replaced with less than or equal to ("≤") and greater than or equal to ("≥") symbols, respectively, without departing from the scope of this description.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of performing object recognition for video frames, the method comprising:
   obtaining one or more video frames of a first video, the one or more video frames including one or more objects, wherein the one or more video frames of the first video have a first resolution;

performing object detection to detect the one or more objects in the one or more video frames of the first video;

obtaining one or more video frames of a second video, the one or more video frames including the one or more objects, wherein the one or more video frames of the second video have a second resolution that is greater than the first resolution;

performing an object recognition process on the one or more video frames of the second video to recognize the one or more objects detected in the one or more video frames of the first video;

obtaining one or more of feedback associated with the object detection performed on the one or more video frames of the first video or feedback associated with the object recognition process performed on the one or more video frames of the second video; and adjusting one or more of a resolution of the first video to a higher resolution or a lower resolution for performing object detection on one or more subsequent frames of the first video based on the feedback associated with the object detection or a resolution of the second video to a higher resolution or a lower resolution for performing the object recognition process on one or more subsequent frames of the second video based on the feedback associated with the object recognition process.

2. The method of claim 1, further comprising:
obtaining the feedback associated with the object detection performed on the one or more video frames of the first video;
adjusting the resolution of frames of the first video based on the feedback associated with the object detection; and
detecting at least one object in a subsequent video frame of the first video after the resolution of the frames of the first video is adjusted, the at least one object being detected based on object detection being performed on the subsequent video frame having the adjusted resolution.

3. The method of claim 1, further comprising:
obtaining the feedback associated with the object recognition process performed on the one or more video frames of the second video;
adjusting the resolution of frames of the second video based on the feedback associated with the object recognition process; and
performing the object recognition process on at least one object in a subsequent video frame of the second video after the resolution of the frames of the second video is adjusted, the object recognition process being performed on the subsequent video frame having the adjusted resolution.

4. The method of claim 1, further comprising:
adjusting the resolution of frames of the first video to a first adjusted resolution based on the feedback associated with the object detection;
adjusting the resolution of frames of the second video to a second adjusted resolution based on the feedback associated with the object recognition process;
detecting at least one object in a subsequent video frame of the first video after the resolution of the frames of the first video is adjusted, the at least one object being detected based on object detection being performed on the subsequent video frame having the first adjusted resolution; and performing the object recognition process on the at least one object detected in the subsequent video frame of the first video, the object recognition process being performed on a subsequent video frame of the second video after the resolution of the frames of the second video is adjusted, the subsequent video frame of the second video having the second adjusted resolution.

5. The method of claim 1, wherein the feedback associated with the object detection is based on one or more of a latency of the object detection or a quality of results from the object detection performed on one or more objects in the one or more video frames of the first video, and wherein the feedback associated with the object recognition process is based on one or more of a latency of the object recognition process or a quality of results from the object recognition process performed on one or more objects in the one or more video frames of the second video.

6. The method of claim 1, wherein adjusting one or more of the resolution of the first video or the resolution of the second video includes:
determining, based on the feedback associated with the object detection, that a latency of the object detection performed on the one or more video frames of the first video is greater than a latency threshold; and
reducing a resolution of at least one video frame of the first video based on the latency of the object detection being greater than the latency threshold.

7. The method of claim 1, wherein adjusting one or more of the resolution of the first video or the resolution of the second video based on the feedback includes:
determining, based on the feedback associated with the object recognition process, that a confidence score generated for the one or more objects by the object recognition process is less than a quality threshold; and
increasing a resolution of at least one video frame of the second video based on the confidence score being less than the quality threshold.

8. The method of claim 1, further comprising:
determining object information associated with the one or more detected objects based on the object detection performed on the one or more video frames of the first video;
modifying the object information from the first resolution to the second resolution; and
performing the object recognition process on the one or more video frames of the second video using the modified object information.

9. The method of claim 8, wherein modifying the object information from the first resolution to the second resolution includes upscaling the object information from the first resolution to the second resolution.

10. The method of claim 8, wherein object information associated with a detected object includes information defining a bounding region generated for the detected object.

11. The method of claim 10, wherein modifying the object information from the first resolution to the second resolution includes upscaling the bounding region from a first size to a second size, wherein the second size is based on a ratio between the first resolution and the second resolution.

12. The method of claim 11, wherein performing the object recognition process on the one or more video frames of the second video using the modified object information includes performing the object recognition process on a region of the one or more video frames of the second video corresponding to the upscaled bounding region.

13. The method of claim 8, wherein object information associated with a detected object includes information defining one or more landmarks on the detected object.

14. The method of claim 13, wherein modifying the object information from the first resolution to the second resolution includes changing a location of a landmark from a first location to a second location, wherein the second location is based on a ratio between the first resolution and the second resolution.

15. The method of claim 1, wherein the first video and the second video are obtained from two different video streams.

16. The method of claim 1, wherein the first video is a downscaled version of the second video.

17. An apparatus for performing object recognition for video frames, comprising:
  a memory configured to store one or more video frames; and
  a processor configured to:
    obtain one or more video frames of a first video, the one or more video frames including one or more objects, wherein the one or more video frames of the first video have a first resolution;
    perform object detection to detect the one or more objects in the one or more video frames of the first video;
    obtain one or more video frames of a second video, the one or more video frames including the one or more objects, wherein the one or more video frames of the second video have a second resolution that is greater than the first resolution;
    perform an object recognition process on the one or more video frames of the second video to recognize the one or more objects detected in the one or more video frames of the first video;
    obtain one or more of feedback associated with the object detection performed on the one or more video frames of the first video or feedback associated with the object recognition process performed on the one or more video frames of the second video; and
    adjust one or more of a resolution of the first video to a higher resolution or a lower resolution for performing object detection on one or more subsequent frames of the first video based on the feedback associated with the object detection or a resolution of the second video to a higher resolution or a lower resolution for performing the object recognition process on one or more subsequent frames of the second video based on the feedback associated with the object recognition process.

18. The apparatus of claim 17, wherein the processor is further configured to:
  obtain the feedback associated with the object detection performed on the one or more video frames of the first video;
  adjust the resolution of frames of the first video based on the feedback associated with the object detection; and
  detect at least one object in a subsequent video frame of the first video after the resolution of the frames of the first video is adjusted, the at least one object being detected based on object detection being performed on the subsequent video frame having the adjusted resolution.

19. The apparatus of claim 17, wherein the processor is further configured to:
  obtain the feedback associated with the object recognition process performed on the one or more video frames of the second video;
  adjust the resolution of frames of the second video based on the feedback associated with the object recognition process; and
  perform the object recognition process on at least one object in a subsequent video frame of the second video after the resolution of the frames of the second video is adjusted, the object recognition process being performed on the subsequent video frame having the adjusted resolution.

20. The apparatus of claim 17, wherein the processor is further configured to:
  adjust the resolution of frames of the first video to a first adjusted resolution based on the feedback associated with the object detection;
  adjust the resolution of frames of the second video to a second adjusted resolution based on the feedback associated with the object recognition process;
  detect at least one object in a subsequent video frame of the first video after the resolution of the frames of the first video is adjusted, the at least one object being detected based on object detection being performed on the subsequent video frame having the first adjusted resolution; and
  perform the object recognition process on the at least one object detected in the subsequent video frame of the first video, the object recognition process being performed on a subsequent video frame of the second video after the resolution of the frames of the second video is adjusted, the subsequent video frame of the second video having the second adjusted resolution.

21. The apparatus of claim 17, wherein the feedback associated with the object detection is based on one or more of a latency of the object detection or a quality of results from the object detection performed on one or more objects in the one or more video frames of the first video, and wherein the feedback associated with the object recognition process is based on one or more of a latency of the object recognition process or a quality of results from the object recognition process performed on one or more objects in the one or more video frames of the second video.

22. The apparatus of claim 17, wherein adjusting one or more of the resolution of the first video or the resolution of the second video includes:
  determining, based on the feedback associated with the object detection, that a latency of the object detection performed on the one or more video frames of the first video is greater than a latency threshold; and
  reducing a resolution of at least one video frame of the first video based on the latency of the object detection being greater than the latency threshold.

23. The apparatus of claim 17, wherein adjusting one or more of the resolution of the first video or the resolution of the second video based on the feedback includes:
  determining, based on the feedback associated with the object recognition process, that a confidence score generated for the one or more objects by the object recognition process is less than a quality threshold; and
  increasing a resolution of at least one video frame of the second video based on the confidence score being less than the quality threshold.

24. The apparatus of claim 17, further comprising:
  determining object information associated with the one or more detected objects based on the object detection performed on the one or more video frames of the first video;
  modifying the object information from the first resolution to the second resolution; and performing the object recognition process on the one or more video frames of the second video using the modified object information.

25. The apparatus of claim 24, wherein object information associated with a detected object includes information defining a bounding region generated for the detected object.

26. The apparatus of claim 25, further comprising:
wherein modifying the object information from the first resolution to the second resolution includes upscaling the bounding region from a first size to a second size, wherein the second size is based on a ratio between the first resolution and the second resolution; and
wherein performing the object recognition process on the one or more video frames of the second video using the modified object information includes performing the object recognition process on a region of the one or more video frames of the second video corresponding to the upscaled bounding region.

27. The apparatus of claim 24, wherein object information associated with a detected object includes information defining one or more landmarks on the detected object, and wherein modifying the object information from the first resolution to the second resolution includes changing a location of a landmark from a first location to a second location, wherein the second location is based on a ratio between the first resolution and the second resolution.

28. The apparatus of claim 17, wherein the first video and the second video are obtained from two different video streams.

29. The apparatus of claim 17, wherein the first video is a downscaled version of the second video.

30. The apparatus of claim 17, wherein the apparatus comprises a mobile device with a camera for capturing the video frames and a display for displaying the video frames.

* * * * *